(12) United States Patent
Araki et al.

(10) Patent No.: US 7,936,712 B2
(45) Date of Patent: May 3, 2011

(54) SIGNAL PROCESSING APPARATUS, SIGNAL PROCESSING METHOD, AND PROGRAM

(75) Inventors: Ryosuke Araki, Tokyo (JP); Takashi Nakanishi, Tokyo (JP); Shunsuke Mochizuki, Tokyo (JP); Masahiro Yoshioka, Tokyo (JP); Hiroto Kimura, Tokyo (JP); Seiji Wada, Kanagawa (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 745 days.

(21) Appl. No.: 11/947,198

(22) Filed: Nov. 29, 2007

(65) Prior Publication Data

US 2008/0151979 A1    Jun. 26, 2008

(30) Foreign Application Priority Data

Dec. 26, 2006 (JP) ................. 2006-350352

(51) Int. Cl.
*H04B 15/00* (2006.01)
(52) U.S. Cl. ........ 370/328; 370/342; 370/350; 455/63.1
(58) Field of Classification Search .............. 370/435, 370/335, 203, 210, 328, 342, 350; 455/506, 455/63.1; 375/340; 348/555
See application file for complete search history.

(56) References Cited

U.S. PATENT DOCUMENTS

| | | | | |
|---|---|---|---|---|
| 4,218,587 A | * | 8/1980 | Elder et al. | 370/435 |
| 4,627,079 A | * | 12/1986 | von der Embse | 375/343 |
| 4,885,756 A | * | 12/1989 | Fontanes et al. | 375/328 |
| 5,831,977 A | * | 11/1998 | Dent | 370/335 |
| 6,088,324 A | * | 7/2000 | Sato | 370/203 |
| 6,263,013 B1 | * | 7/2001 | Hendrickson | 375/150 |
| 6,687,315 B2 | * | 2/2004 | Keevill et al. | 375/341 |
| 7,012,972 B1 | * | 3/2006 | Isaksen et al. | 375/326 |
| 7,605,868 B2 | * | 10/2009 | Kondo et al. | 348/555 |

(Continued)

FOREIGN PATENT DOCUMENTS

JP    3399022    2/2003

(Continued)

OTHER PUBLICATIONS

Title: Photon Counting and Analog Television Systems with Digital Real Time Image Processing and Display; Authors: Cenalmor, V., Lamy, P. L., Perrin, J. M., & Nguyen-Trong, T. Journal: Astronomy and Astrophysics, vol. 69, p. 411 (1978).*

(Continued)

*Primary Examiner* — Salman Ahmed
(74) *Attorney, Agent, or Firm* — Oblon, Spivak, McClelland, Maier & Neustadt, L.L.P.

(57) ABSTRACT

In a signal processing apparatus adapted to process a signal transmitted via a transmission path, an acquisition unit acquires a signal value of a specific symbol from a signal transmitted via the transmission path, and a prediction unit predicts a signal value of the specific symbol for each of values allowed to be taken by the specific symbol, on the basis of values taken by a plurality of symbols transmitted before the transmission of the specific symbol and on the basis of characteristics of influences of the signal values of the plurality of symbols transmitted before the transmission of the specific symbol on the signal value of the specific symbol. A determination unit determines the value taken by the specific symbol, on the basis of the signal value of the specific symbol acquired by the acquisition unit and the predicted values for respective values allowed to be taken by the specific symbol.

8 Claims, 15 Drawing Sheets

U.S. PATENT DOCUMENTS

| | | | |
|---|---|---|---|
| 7,643,585 B2 * | 1/2010 | Sawada | 375/341 |
| 7,653,512 B2 * | 1/2010 | Cheung et al. | 702/184 |
| 7,664,618 B2 * | 2/2010 | Cheung et al. | 702/183 |
| 7,822,161 B2 * | 10/2010 | Lee et al. | 375/355 |
| 2002/0126774 A1 * | 9/2002 | Harada et al. | 375/340 |
| 2003/0087657 A1 * | 5/2003 | Wilborn et al. | 455/506 |
| 2004/0073321 A1 | 4/2004 | Kondo | |
| 2009/0219803 A1 * | 9/2009 | Jwa | 370/210 |

FOREIGN PATENT DOCUMENTS

| | | |
|---|---|---|
| JP | 2003-179821 | 6/2003 |

OTHER PUBLICATIONS

Highlights of signal processing for communications; from umn.eduGB Giannakis—IEEE Signal Processing Magazine, 1999.*

Multiuser interference mitigation in noncoherent UWB ranging via nonlinear filtering from hindawi.comZ Sahinoglu—EURASIP Journal on Wireless 2006.*

U.S. Appl. No. 11/947,049, filed Nov. 29, 2007, Mochizuki, et al.

U.S. Appl. No. 11/947,423, filed Nov. 29, 2007, Nakanishi, et al.

U.S. Appl. No. 11/953,397, filed Dec. 10, 2007, Mochizuki, et al.

* cited by examiner

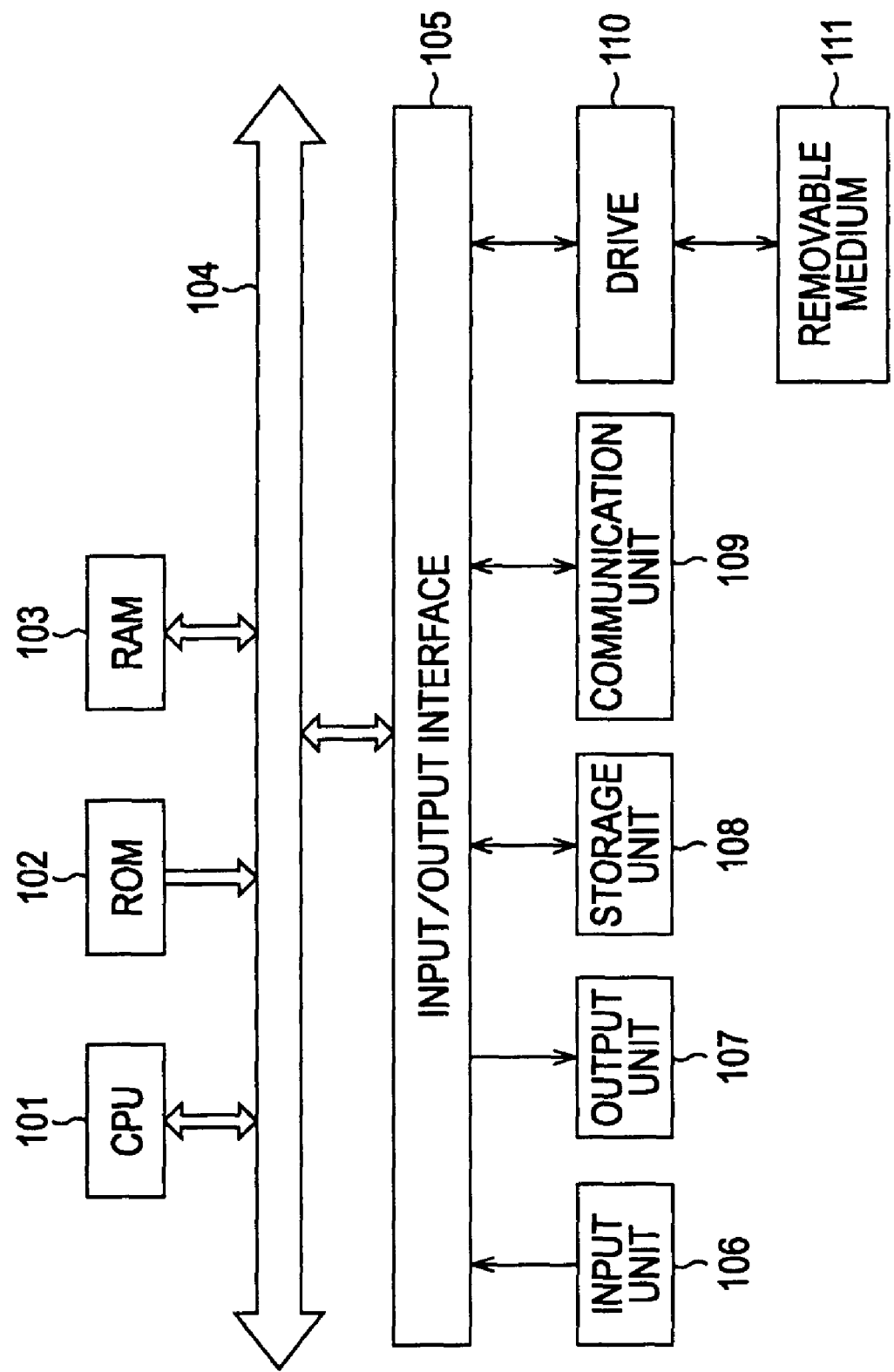

SIGNAL PROCESSING APPARATUS, SIGNAL PROCESSING METHOD, AND PROGRAM

CROSS REFERENCES TO RELATED APPLICATIONS

The present invention contains subject matter related to Japanese Patent Application JP 2006-350352 filed in the Japanese Patent Office on Dec. 26, 2006, the entire contents of which are incorporated herein by reference.

BACKGROUND OF THE INVENTION

1. Field of the Invention

The present invention relates to a signal processing apparatus, a signal processing method, and a program. More specifically, the present invention relates to a signal processing apparatus, a signal processing method, and a program, capable of correctly determining a value of a symbol represented by a signal.

2. Description of the Related Art

In a related art, a signal processing apparatus receives an image signal from an external device such as a tuner adapted to receive a television broadcast signal or a DVD (Digital Versatile Disc) player, processes the received image signal, and supplies the resultant image signal to a display such as a CRT (Cathode Ray Tube) or a LCD (Liquid Crystal Display).

The signal processing performed by such a signal processing apparatus includes, for example, a process of removing noise from the image signal supplied from an external device, a process of converting an image signal supplied from an external device into a form having higher quality than the original quality, and a process of adjusting brightness or contrast of an image displayed on a display.

FIG. 1 is a block diagram illustrating an example of a configuration of a signal processing apparatus.

As shown in FIG. 1, the signal processing apparatus 11 includes a case 12, connectors $13_1$ to $13_4$, an input selector 14, a signal router 15, connectors $16_1$ to $16_4$, connectors $17_1$ to $17_3$, functional blocks $18_1$ to $18_3$, a connector 19, a remote commander 20, an operation unit 21, a system control block 22, and a control bus 23.

In the signal processing apparatus 11, the connectors $13_1$ to $13_4$ are connected to the input selector 14 via signal cables, and the input selector 14 is connected to the signal router 15 via a signal cable. The signal router 15 is connected to the connectors $16_1$ to $16_4$ and the connector 19 via signal cables. The signal router 15 is connected to the functional blocks $18_1$ to $18_3$ via the connectors $16_1$ to $16_3$ and the connectors $17_1$ to $17_3$. The input selector 14, the signal router 15, the connectors $16_1$ to $16_4$, and the system control block 22 are connected to each other via the control bus 23.

The case 12 is formed in the shape of, for example, a rectangular box. On the outer surface of the case 12, the connectors $13_1$ to $13_4$, the connector 19, and the operation unit 21 are disposed. In the inside of the case 12, the input selector 14, the signal router 15, the connectors $16_1$ to $16_4$, the connectors $17_1$ to $17_3$, the functional blocks $18_1$ to $18_3$, the system control block 22, and the control bus 23 are disposed.

The connectors $13_1$ to $13_4$ are for a connection, via a cable, between the signal processing apparatus 11 and an external apparatus (not shown) such as a tuner or a DVD player from which an image signal is supplied to the signal processing apparatus 11.

Image signals are supplied from external apparatuses to the input selector 14 via the connectors $13_1$ to $13_4$. Under the control of the system control block 22, the input selector 14 selects one of image signals supplied from the external apparatuses via the connectors $13_1$ to $13_4$, and the input selector 14 supplies the selected image signal to the signal router 15.

Under the control of the system control block 22, the signal router 15 supplies the signal received via the input selector 14 to the functional blocks $18_1$ to $18_3$ the connectors $16_1$, to $16_3$ and the connectors $17_1$ to $17_3$. The functional blocks $18_1$ to $18_3$ perform signal processing on the signals and return the resultant signals to the signal router 15. The signal router 15 transfers the received signals to a display (not shown) connected to the connector 19.

The connectors $17_1$ to $17_3$ are connectable/disconnectable to/from the connectors $16_1$, to $16_3$ so that the functional blocks $18_1$ to $18_3$ are connected to the signal router 15 or the control bus 23. The connector $16_4$ is for future use of a connection with a new functional block or the like which will be added to the signal processing apparatus 11.

The functional blocks $18_1$ to $18_3$ include a signal processing circuit for noise reduction, image conversion, or image correction. The functional blocks $18_1$ to $18_3$ perform signal processing on the signal supplied from the signal router 15 and return the resultant signal to the signal router 15.

The connector 19 is for connecting, via a cable, the signal processing apparatus 11 to the display for displaying an image in accordance with the image signal output from the signal processing apparatus 11.

The remote commander 20 includes a plurality of buttons or the like. If a button is operated by a user, an operation signal depending on the operated button is transmitted in the form of an infrared ray or the like to the system control block 22.

The operation unit 21 includes a plurality of buttons or the like, as with the remote commander 20. If a button is operated by a user, an operation signal depending on the operated button is supplied to the system control block 22.

If the system control block 22 receives the operation signal generated depending on the operation of the user from the remote commander 20 or the operation unit 21, the system control block 22 controls the input selector 14, the signal router 15, and the functional blocks $18_1$ to $18_3$ via the control bus 23 so that a process is performed in accordance with the operation signal.

In the signal processing apparatus 11, as described above, an image signal is supplied to the signal router 15 via the connectors $13_1$ to $13_4$ and the input selector 14, and an image signal is transmitted between the signal router 15 and functional blocks $18_1$ to $18_3$ via signal cables.

A recent trend is toward an increase in resolution of images. Accordingly, the data size of the image signal processed by the signal processing apparatus 11 tends to increase. To handle image signals with great data sizes, it is necessary to transmit image signals at a high rate between the signal router 15 and the functional blocks $18_1$ to $18_3$ via cables. However, the increase in the signal transmission rate can create problems associated with frequency characteristics of signal cables, crosstalk, a difference in signal propagation timing (skew) between parallel signal cables, etc.

Japanese Unexamined Patent Application Publication No. 2003-179821 discloses a signal processing apparatus adapted to transmit signals by wireless communication using an electromagnetic wave among circuit boards disposed in a case thereby performing signal processing.

Use of wireless transmission using electromagnetic waves between the signal router 15 and the functional blocks $18_1$ to $18_3$ makes it possible to avoid the problems which can occur when signals are transmitted at high rates via signal cables.

However, if signals are transmitted by wireless communication using electromagnetic waves between signal router 15 and the functional blocks $18_1$ to $18_3$ in the inside of the case 12 of the signal processing apparatus 11, a plurality of transmission paths (multi-path) which are different in length can occur due to reflection of electromagnetic waves from walls of the case 12 or due to diffraction of electromagnetic waves by circuit boards disposed in the case 12. The signal transmission via multiple paths can shift the phase of the signal arriving at the receiving part, and thus interference between symbols represented by signals (electromagnetic waves) can occur.

If such intersymbol interference occurs, signal values of symbols transmitted before a particular symbol can influence the signal value of the particular symbol, and thus the signal value of this particular symbol can change (this phenomenon is called multipath fading). If the signal value of a symbol is changed as a result of influence of other symbols, it is difficult for the receiving part to determine the correct symbol value of the received symbol. For example, in a case where one bit is transmitted by one symbol, it is difficult to correctly determine which one of 1 and 0 is originally intended by the symbol.

The problem associated with the multipath interference can occur not only in wireless communication within a case, but also in mobile communication between portable telephone devices due to a shift in signal phase caused by multipath produced by reflection of electromagnetic waves from buildings. Interference can also occur between an original signal propagating along a cable and a signal reflected by an end of the cable.

For example, Japanese Patent No. 3399022 discloses a technique to use a Vitabi equalizer to remove interference due to multipath.

In the signal processing on signals transmitted at a high rate as with signal processing on the image signal (in particular on non-compressed image signals), it is required that a delay occurring during the signal processing should be short enough and the delay should be controlled at a constant value. However, the Vitabi equalizer creates a large delay, and the created delay is not constant. Besides, in the signal processing on image signals, it is required to perform the signal processing continuously in real time. However, it is difficult to perform process associated with the Vitabi equalizer in real time.

SUMMARY OF THE INVENTION

As described above, in a signal processing apparatus, if a signal is simply transmitted by wireless communication using an electromagnetic wave, the signal value of a symbol can change due to intersymbol interference, which makes it difficult to correctly determine the value taken by the symbol.

In view of the above, it is desirable to provide a technique to correctly determine a value of a symbol represented by a signal.

According to an embodiment of the present invention, there is provided a signal processing apparatus adapted to process a signal transmitted via a transmission path in which a signal value of a specific symbol is influenced in a stationary manner by signal values of a plurality of symbols transmitted before the transmission of the specific symbol, comprising acquisition means for acquiring the signal value of the specific symbol from a signal transmitted via the transmission path, prediction means for predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol, and determination means for determining the value taken by the specific symbol, on the basis of the signal value of the specific symbol acquired by the acquisition means and the predicted values given by the prediction means for respective values allowed to be taken by the specific symbol.

According to an embodiment of the present invention, there is provided a method of processing a signal transmitted via a transmission path in which a signal value of a specific symbol is influenced in a stationary manner by signal values of a plurality of symbols transmitted before the transmission of the specific symbol, comprising the steps of acquiring the signal value of the specific symbol from a signal transmitted via the transmission path, predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol, and determining the value taken by the specific symbol, on the basis of the signal value of the specific symbol acquired from the signal transmitted via the transmission path and on the basis of the predicted values for respective values allowed to be taken by the specific symbol.

According to an embodiment of the present invention, there is provided a program executable by a computer adapted to control a signal processing apparatus so as to process a signal transmitted via a transmission path in which a signal value of a specific symbol is influenced in a stationary manner by signal values of a plurality of symbols transmitted before the transmission of the specific symbol, the process comprising the steps of acquiring the signal value of the specific symbol from a signal transmitted via the transmission path, predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol, and determining the value taken by the specific symbol, on the basis of the signal value of the specific symbol acquired from the signal transmitted via the transmission path and on the basis of the predicted values for respective values allowed to be taken by the specific symbol.

As described above, the signal value of the specific symbol is acquired from a signal transmitted via the transmission path, and the signal value of the specific symbol is predicted for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol. The value taken by the specific symbol is determined on the basis of the signal value of the specific symbol acquired from the signal transmitted via the transmission path and on the basis of the predicted values for respective values allowed to be taken by the specific symbol.

As described above, the present invention provides the great advantage that a value of a symbol represented by a signal can be correctly determined.

BRIEF DESCRIPTION OF THE DRAWINGS

FIG. 15 is a block diagram illustrating an example of a configuration of a personal computer.

DESCRIPTION OF THE PREFERRED EMBODIMENTS

Figure 1:
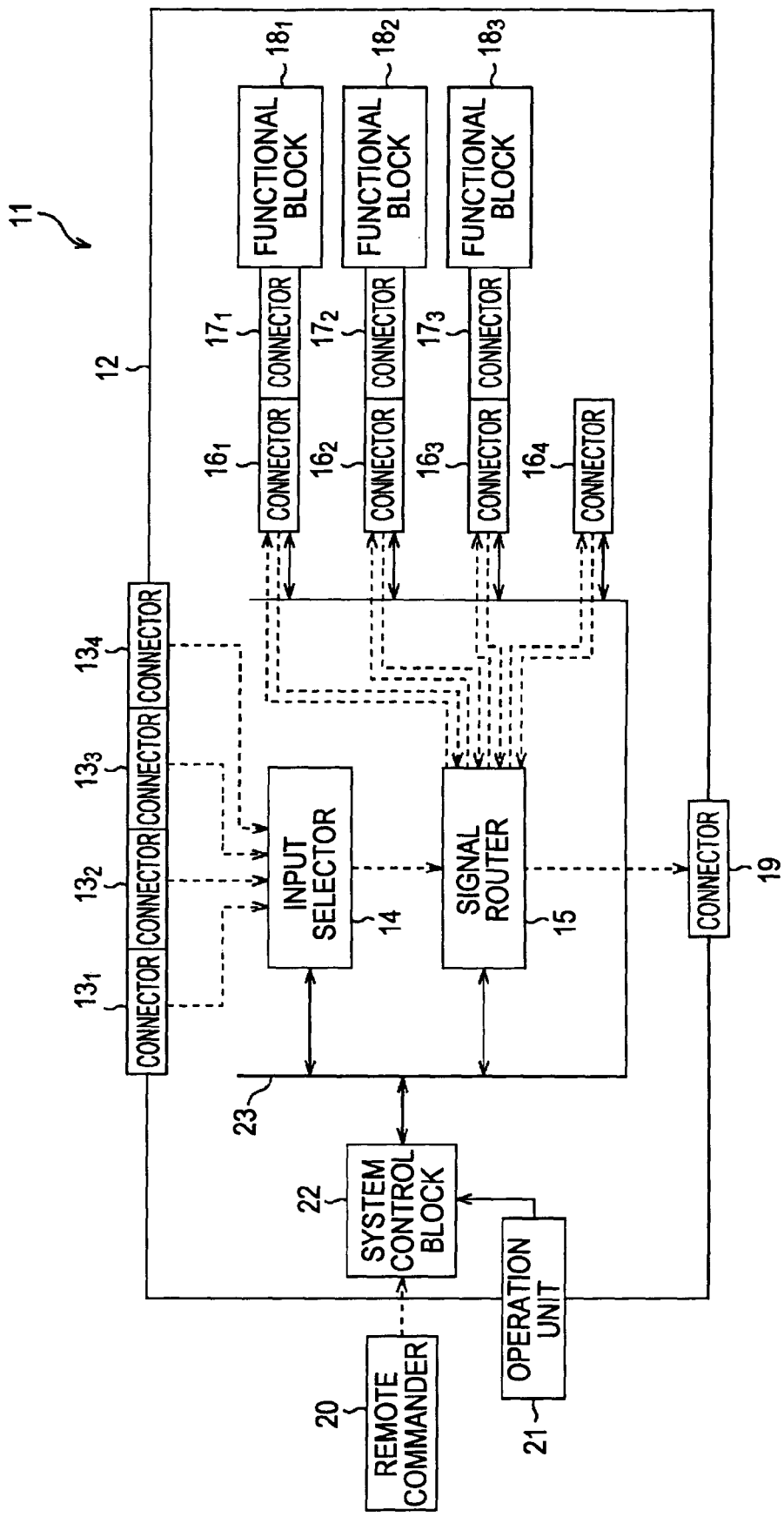
FIG. 1 is a block diagram illustrating an example of a configuration of a signal processing apparatus.

Before describing an embodiment of the present invention, the correspondence between the features of the invention and the specific elements disclosed in embodiments of the present invention is discussed below. This description is intended to assure that embodiments supporting the invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the invention, that does not necessarily mean that the element does not relate to other features of the invention.

According to an embodiment of the present invention, there is provided a signal processing apparatus adapted to process a signal transmitted via a transmission path in which a signal value of a specific symbol is influenced in a stationary manner by signal values of a plurality of symbols transmitted before the transmission of the specific symbol, comprising acquisition means (for example, an analog-to-digital converter 93 shown in FIG. 10) for acquiring the signal value of the specific symbol from a signal transmitted via the transmission path, prediction means (for example, a signal value predictor 95 or 96 shown in FIG. 10) for predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol, and determination means (for example, a comparator 94 shown in FIG. 10) for determining the value taken by the specific symbol, on the basis of the signal value of the specific symbol acquired by the acquisition means and the predicted values given by the prediction means for respective values allowed to be taken by the specific symbol.

The signal processing apparatus may further include receiving means (for example, a wireless receiver 73 shown in FIG. 5) for receiving a test signal including a plurality of symbols taking predetermined values, and characteristic acquisition means (for example, a statistical processing unit 74 shown in FIG. 5) for acquiring a characteristic of an influence of a signal value of a symbol, included in the symbols of the test signal, transmitted before the transmission of the specific symbol on the signal value of the specific value, on the basis of the signal value of the specific symbol of the test signal received by the receiving means.

Figure 11:
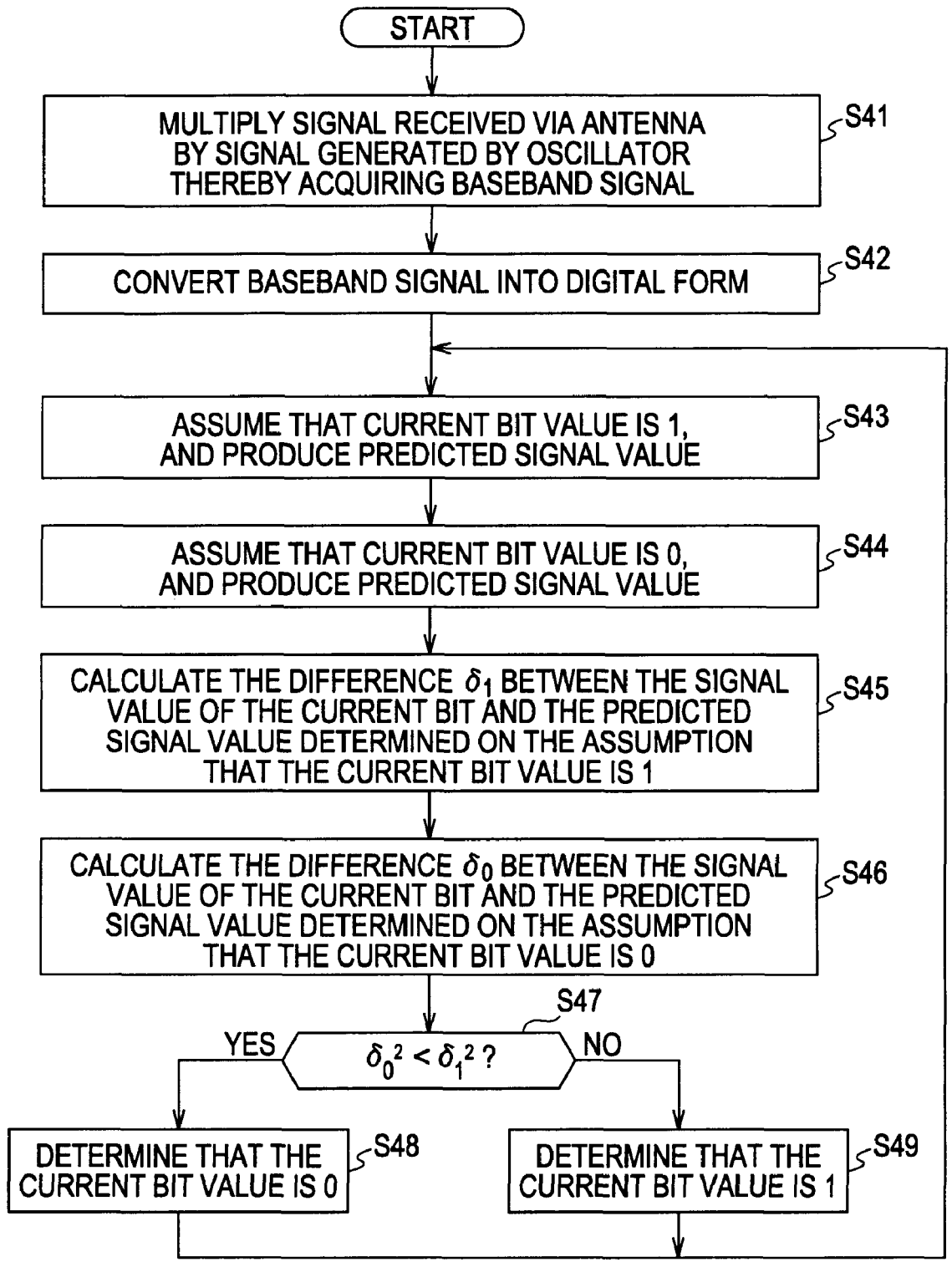
FIG. 11 is a flow chart illustrating a process performed by a functional block to determine the current bit value of a signal.

According to an embodiment of the present invention, there is provided a method of processing a signal transmitted via a transmission path in which a signal value of a specific symbol is influenced in a stationary manner by signal values of a plurality of symbols transmitted before the transmission of the specific symbol, comprising the steps of acquiring the signal value of the specific symbol from a signal transmitted via the transmission path (for example, in step S42 shown in FIG. 11), predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol (for example, in step S43 or S44 shown in FIG. 11), and determining the value taken by the specific symbol, on the basis of the signal value of the specific symbol acquired from the signal transmitted via the transmission path and on the basis of the predicted values for respective values allowed to be taken by the specific symbol (for example, in step S47 shown in FIG. 11). According to an embodiment of the present invention, there is provided a program executable by a computer adapted to control a signal processing apparatus so as to process a signal transmitted via a transmission path in which a signal value of a specific symbol is influenced in a stationary manner by signal values of a plurality of symbols transmitted before the transmission of the specific symbol, the process comprising the steps of acquiring the signal value of the specific symbol from a signal transmitted via the transmission path (for example, in step S42 shown in FIG. 11), predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol (for example, in step S43 or S44 shown in FIG. 11), and determining the value taken by the specific symbol, on the basis of the signal value of the specific symbol acquired from the signal transmitted via the transmission path and on the basis of the predicted values for respective values allowed to be taken by the specific symbol (for example, in step S47 shown in FIG. 11).

The present invention is described in further detail below with reference to embodiments in conjunction with the accompanying drawings.

Figure 2:
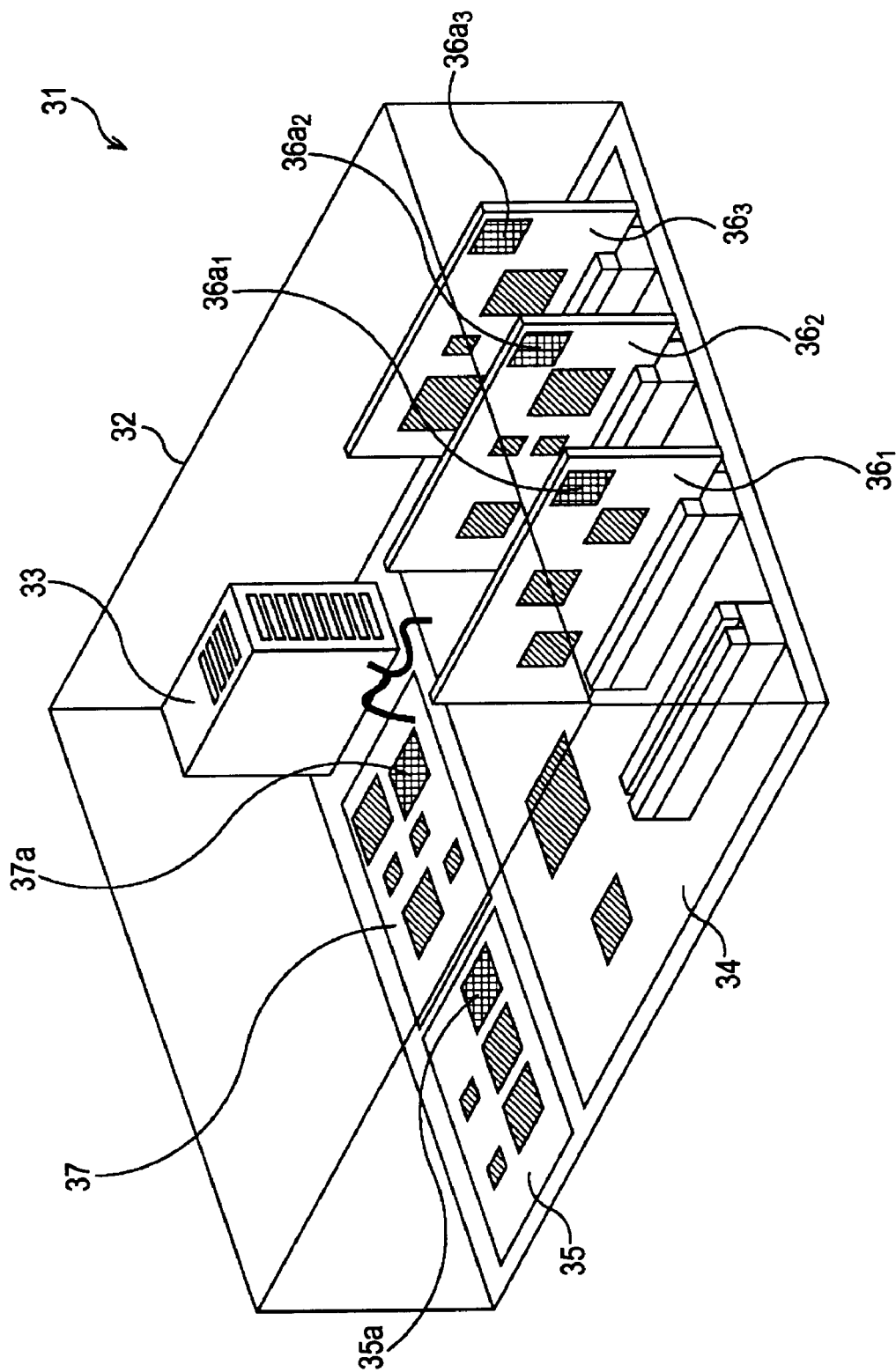
FIG. 2 is a perspective view of a signal processing apparatus according to an embodiment of the present invention.

FIG. 2 is a perspective view of a signal processing apparatus according to an embodiment of the present invention.

As shown in FIG. 2, the signal processing apparatus 31 includes a case 32, a power supply module 33, a platform board 34, an input board 35, signal processing boards $36_1$ to $36_3$, and an output board 37.

The case 32 is formed in the shape of a rectangular box. In the inside of the case 32, the power supply module 33, the platform board 34, the input board 35, the signal processing boards $36_1$ to $36_3$, and the output board 37 are disposed.

The power supply module 33 is adapted to supply power to the platform board 34, the input board 35, the signal processing boards $36_1$ to $36_3$, and the output board 37.

The signal processing boards $36_1$ to $36_3$ are connected to the platform board 34, and power is supplied from the power supply module 33 to the signal processing boards $36_1$ to $36_3$ via the platform board 34.

The input board 35 is connected to a connector (such as connectors $43_1$ to $43_4$ described later with reference to FIG. 3) disposed on the outer side of the case 32. An image signal is supplied from an external apparatus (not shown) to the input board 35 via the connector. The input board 35 has an antenna 35a for wireless communication using an electromagnetic wave whereby the image signal supplied from the external apparatus is supplied to the signal processing boards $36_1$ to $36_3$ via the antenna 35a.

The signal processing boards $36_1$ to $36_3$ respectively have antennas $36a_1$ to $36a_3$ for wireless communication using an electromagnetic wave. The image signal output from the input board 35 is supplied to the signal processing boards $36_1$ to $36_3$ via the antennas $36a_1$ to $36a_3$. The signal processing boards $36_1$ to $36_3$ perform signal processing such as noise reduction, image conversion, or image correction on the image signal supplied from the input board 35, and return the resultant image signal to the output board 37 via the antennas $36a_1$ to $36a_3$.

The output board 37 has an antenna 37a for wireless communication using an electromagnetic wave, and the output board 37 is connected to a connector (for example, a connector 47 shown in FIG. 3) disposed on the outer side of the case 32. If the output board 37 receives an image signal from one of the signal processing boards $36_1$ to $36_3$ via the antenna 37a, the output board 37 supplies the received image signal to a display (not shown) connected to a connector disposed on the case 32.

Figure 3:
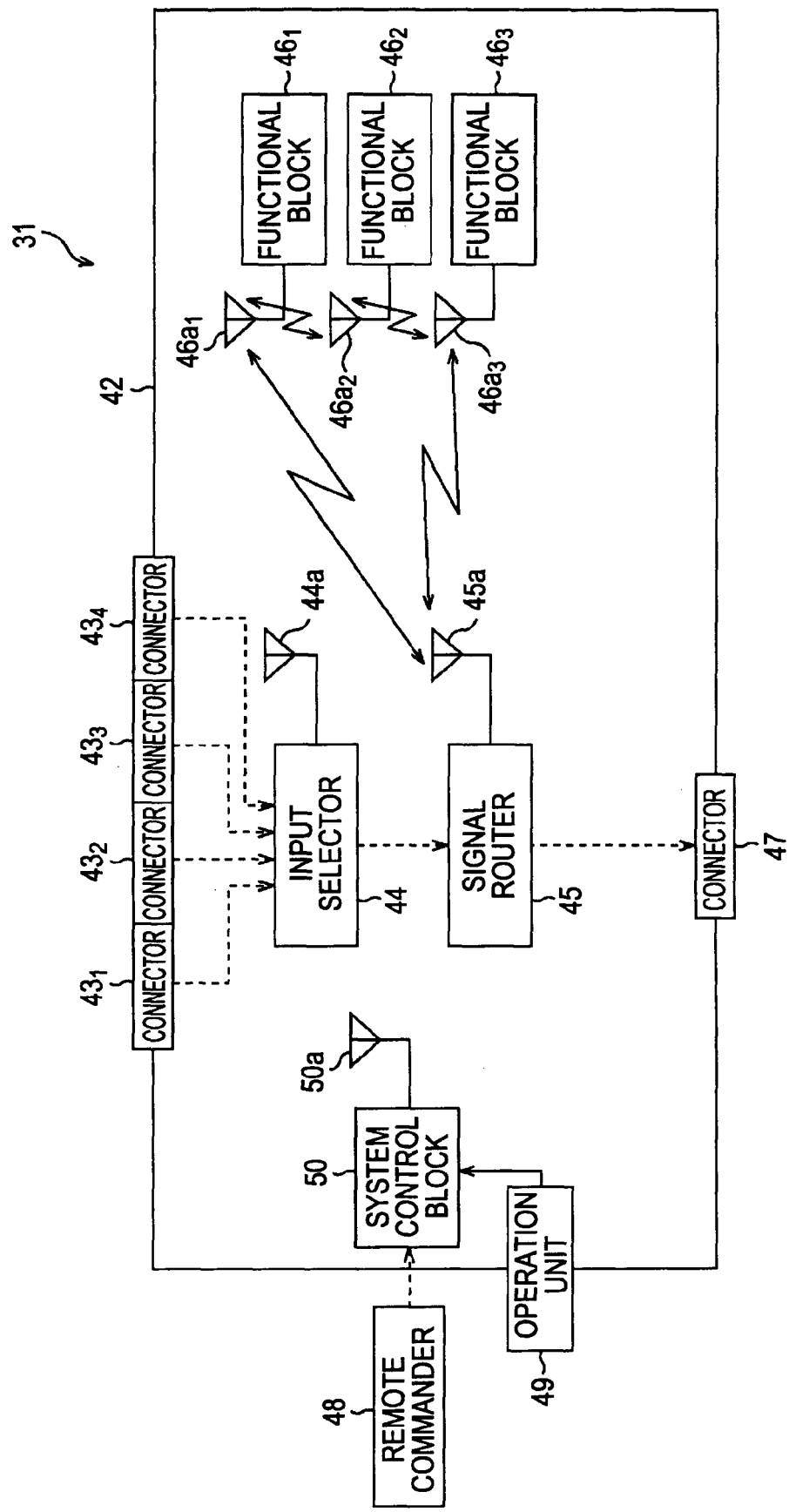
FIG. 3 is a block diagram illustrating a configuration of a signal processing apparatus according to an embodiment of the present invention.

FIG. 3 is a block diagram illustrating an example of a configuration of the signal processing apparatus 31 shown in FIG. 2.

As shown in FIG. 3, the signal processing apparatus 31 includes a case 42, connectors $43_1$ to $43_4$, an input selector 44, a signal router 45, functional blocks $46_1$ to $46_3$, a connector 47, a remote commander 48, an operation unit 49, and a system control block 50.

In the signal processing apparatus 31, the connectors $43_1$ to $43_4$ are connected to the input selector 44 via signal cables, the input selector 44 is connected to the signal router 45 via a signal cable, and the signal router 45 is connected to the connector 47 via a signal cable.

On the outer side of the case 42 corresponding to the case 32 shown in FIG. 2, the connectors $43_1$ to $43_4$, the connector 47, and the operation unit 49 are disposed. In the inside of the case 42, the input selector 44, the signal router 45, the functional blocks $46_1$ to $46_3$, and the system control block 50 are disposed.

The connectors $43_1$ to $43_4$ function to connect, via a cable, the signal processing apparatus 31 to an external apparatus (not shown) such as a tuner or a DVD player which supplies an image signal to the signal processing apparatus 31.

The input selector 44 is disposed, for example, on the input board 35 shown in FIG. 2, and includes an antenna 44a corresponding to the antenna 35a shown in FIG. 2. Image signals are supplied from external apparatuses to the input selector 44 via the connectors $43_1$ to $43_4$. Under the control of the system control block 50, the input selector 44 selects one of the image signals supplied from the external apparatuses via the connectors $43_1$ to $43_4$, and the input selector 44 supplies the selected image signal to the signal router 45.

The signal router 45 is disposed, for example, on the output board 37 shown in FIG. 2, and includes an antenna 45a corresponding to the antenna 37a shown in FIG. 2. Under the control of the system control block 50, the signal router 45 supplies the image signal received from the input selector 44 to the functional blocks $46_1$ to $46_3$, by wireless communication using an electromagnetic wave, via the antenna 45a.

If the signal router 45 receives an image signal from one of the functional blocks $46_1$ to $46_3$ by wireless communication using an electromagnetic wave via the antenna 45a, the signal router 45 supplies the image signal received from one of the functional blocks $46_1$ to $46_3$ to the display (not shown) connected to the connector 47.

The functional blocks $46_1$ to $46_3$ are disposed on the respective signal processing boards $36_1$ to $36_3$ shown in FIG. 2, and the functional blocks $46_1$ to $46_3$ respectively include antennas $46a_1$ to $46a_3$ corresponding to the antennas $36a_1$ to $36a_3$ shown in FIG. 2.

If the functional blocks $46_1$ to $46_3$ receives an image signal transmitted from the signal router 45 by wireless communication using an electromagnetic wave via the antennas $46a_1$ to $46a_3$, the functional blocks $46_1$ to $46_3$ perform signal processing such as noise reduction, image conversion, or image correction on the received image signal. The functional blocks $46_1$ to $46_3$ transmit the resultant image signal to the signal router 45 by wireless communication using an electromagnetic wave via the antennas $46a_1$ to $46a_3$. Signal transmission is also possible among the functional blocks $46_1$ to $46_3$ via the antennas $46a_1$ to $46a_3$.

In the following discussion, when it is not necessary to distinguish the functional blocks $46_1$ to $46_3$ from each other, an expression "functional block 46" or "functional blocks 46" will be used. Similarly, an expression "antenna 46a" or "antennas 46a" will be used to describe the functional blocks $46_1$ to $46_3$ when it is not necessary to distinguish them from each other.

The connector 47 functions, as with the connector 19 shown in FIG. 1, to connect, via a cable, the signal processing apparatus 31 to the display for displaying an image in accordance with the image signal output from the signal processing apparatus 31.

The remote commander 48 and the operation unit 49 serve, as with the remote commander 20 or the operation unit 21 shown in FIG. 1, as a unit used by a user to generate and transmit an operation signal to the system control block 50.

The system control block 50 is disposed, for example, on the platform board 34 shown in FIG. 2, and includes an antenna 50a. If the system control block 50 receives the operation signal generated depending on the operation of the user from the remote commander 48 or the operation unit 49, the system control block 50 controls the input selector 44, the signal router 45, or the functional block 46 by wireless communication using an electromagnetic wave via the antenna 50a so that a process is performed in accordance with the operation signal.

In the signal processing apparatus 31, as described above, image signals are transmitted between the signal router 45 and functional blocks 46 by wireless communication using an electromagnetic wave within the case 42 of the signal processing apparatus 31.

In the wireless communication in the inside of the case 42, an electromagnetic wave radiated from the antenna 45a of the signal router 45 is reflected by walls or the like of the case 42. Thus, the electromagnetic wave is transmitted via multiple paths which can create a shift of the phase of the electromagnetic wave (signal) arriving at the functional blocks 46. The shift of the phase causes interference to occur among symbols represented by the signal received by the functional blocks 46. In other words, the waveform of the signal is distorted by the interference.

Figure 4:
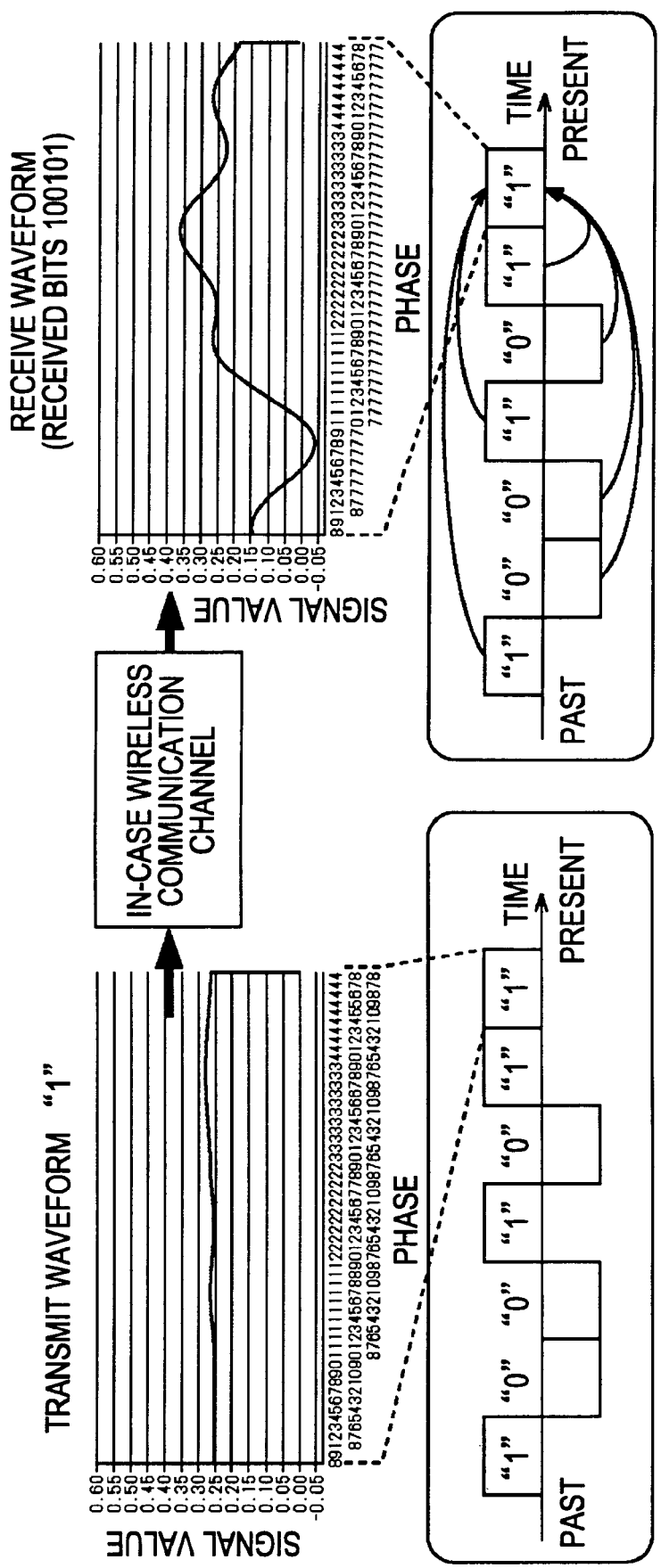
FIG. 4 is a diagram for explanation of distortion of a waveform represented by signal values of bits transmitted from a signal router to a functional block.

Referring to FIG. 4, an explanation is provided as to distortion of the waveform represented by the signal values of symbols (bits) transmitted from the signal router 45 to the functional blocks 46.

Depending on the modulation method used in the wireless communication, one signal symbol can represent a plurality of bits. In the following discussion, one bit (0 or 1) is represented by one symbol, as with the case of a BPSK (binary phase shift keying) method.

For example, the signal is transmitted in the form of a sequence of bits from the signal router 45 to the functional blocks 46 in such a manner that when a bit of the sequence of bits is "1", an electromagnetic wave with an amplitude of 0.25 is radiated from the antenna 45a of the signal router 45, while an electromagnetic wave with an amplitude of −0.25 is radiated from the antenna 45a of the signal router 45 when a bit is "0". Hereinafter, the amplitude of the electromagnetic wave varying depending on the bit value will be referred to as a signal value of a bit.

In a lower left part of FIG. 4, a part of a signal transmitted from the signal router 45 is shown. More specifically, the signal shown in the lower left part of FIG. 4 includes a total of 7 bits from a bit 6 bits before the current bit to the current bit of the signal transmitted from the signal router 45.

In the specific example shown in the lower left part of FIG. 4, the signal includes 7 bits "1, 0, 0, 1, 0, 1, 1", (6 bits before, 5 bits before, 4 bits before, 3 bits before, 2 bits before, 1 bit before, and the current bit).

In FIG. 4, an example of a waveform represented by signal values of the current bit transmitted from the signal router 45 (more specifically, a waveform given by an envelope of amplitudes of an electromagnetic wave corresponding to the current bit output from the antenna 45a of the signal router 45) is shown in an upper left part of the figure in which a horizontal axis represents the phase of the current bit, and a vertical axis represents the signal value of the bit.

In this figure, it is assumed that the current bit transmitted from the signal router 45 is "1", and thus the waveform represented by the signal values of the current bit transmitted from the signal router 45 has a nearly linear shape with a signal value of about 0.25.

In a lower right part of FIG. 4, a part of a signal received by a functional block 46 is shown. In the specific example shown in the lower right part of FIG. 4, the signal includes 7 bits "1, 0, 0, 1, 0, 1, 1", which is similar to those, shown in the lower left part of FIG. 4, transmitted from the signal router 45.

In an upper right part of FIG. 4, a waveform represented by the signal value of the current bit received by the functional block 46 is shown. In FIG. 4, a horizontal axis represents the phase of the current bit, and a vertical axis represents the signal value of the bit. The current true bit value received by the functional block 46 is "1". However, the waveform represented by the signal value of the current bit value is not linear but has distortion, unlike the waveform shown in the upper left part of FIG. 4.

In the example shown in FIG. 4, bits having a value of "0" represented by a signal value of −0.25 were transmitted 2 bits, 4 bits, and 5 bits before the current bit, while bits having a value of "1" represented by a signal value of 0.25 were transmitted 1 bit, 3 bits, and 6 bits before the current bit. When these bits are transmitted via the multiple paths, delays occur. Delayed signals interfere with the current bit "1" which would have a signal value of 0.25 in an ideal state where there is no interference, and thus the signal value of the current bit changes from the ideal value of 0.25. As a result of a change in the signal value of the current bit, distortion occurs in the waveform represented by the signal value of the current bit.

The distortion of the waveform represented by the signal values of the current bit makes it difficult for the functional block 46 to correctly determine whether the current bit is "1", or "0".

In the inside of the case 32 of the signal processing apparatus 31, as shown in FIG. 2, the power supply module 33, the platform board 34, the input board 35, the signal processing boards $36_1$ to $36_3$, and the output board 37 are disposed at fixed locations. Therefore, the electromagnetic wave is reflected in a stationary manner by the walls of the case 32 and circuit boards, and thus the interference by the reflected electromagnetic wave, that is, the influence of the multiple paths occurs in a stationary manner.

Such stationary influence of the multiple paths produces stationary distortion of the waveform represented by the signal values of the current bit. Thus, for example, in the case where the sequence of bits from 6 bits before the current bit to the current bit is "1, 0, 0, 1, 0, 1, 1" as shown in the lower right part of FIG. 4, distortion of the waveform represented by the signal values of the current bit occurs in a stationary manner as shown in the upper right part of FIG. 4.

Therefore, if characteristics of distortion of the waveform represented by the signal value of the current bit, due to delayed arrivals, caused by multiple path transmission, of one or more bits transmitted before the current is stored in advance in the functional block 46 (hereinafter, it is assumed that such characteristics are given in the form of a delay profile), then the functional block 46 can correctly determined whether the current bit is "1" or "0" on the basis of the delay profile and the waveform represented by the signal values of the current bit received from the signal router 45.

The delay profile can be acquired by transmitting, a plurality of times, a test pattern signal including a predetermined sequence of bits between the signal router 45 and the functional block 46 before the image signal is transmitted by wireless communication in the signal processing apparatus 31.

In a case where the test pattern signal includes 7 bits each of which can take "0" or "1", 128 ($=2^7$) different patterns may be employed as the test pattern signal (as with the case of a test pattern signal shown in FIG. 13), or only 7 patterns each of which has "1" at only one of the 7 bits may be employed as the test pattern signal.

More specifically, in the case where the test pattern signal includes 7 bits, the following 7 patterns may be used as the test pattern signal: "0, 0, 0, 0, 0, 0, 1", "0, 0, 0, 0, 0, 1, 0", "0, 0, 0, 0, 1, 0, 0", "0, 0, 0, 1, 0, 0, 0", "0, 0, 1, 0, 0, 0, 0", "0, 1, 0, 0, 0, 0, 0" and "1, 0, 0, 0, 0, 0, 0". 7 delay profiles corresponding to the 7 test pattern signals are acquired, and a determination is made as to whether the current bit is "1" or "0" on the basis of the result of calculation (for example, according to equation (1) described later) between the 7 delay profiles and a plurality of bits transmitted before the current bit.

Figure 5:
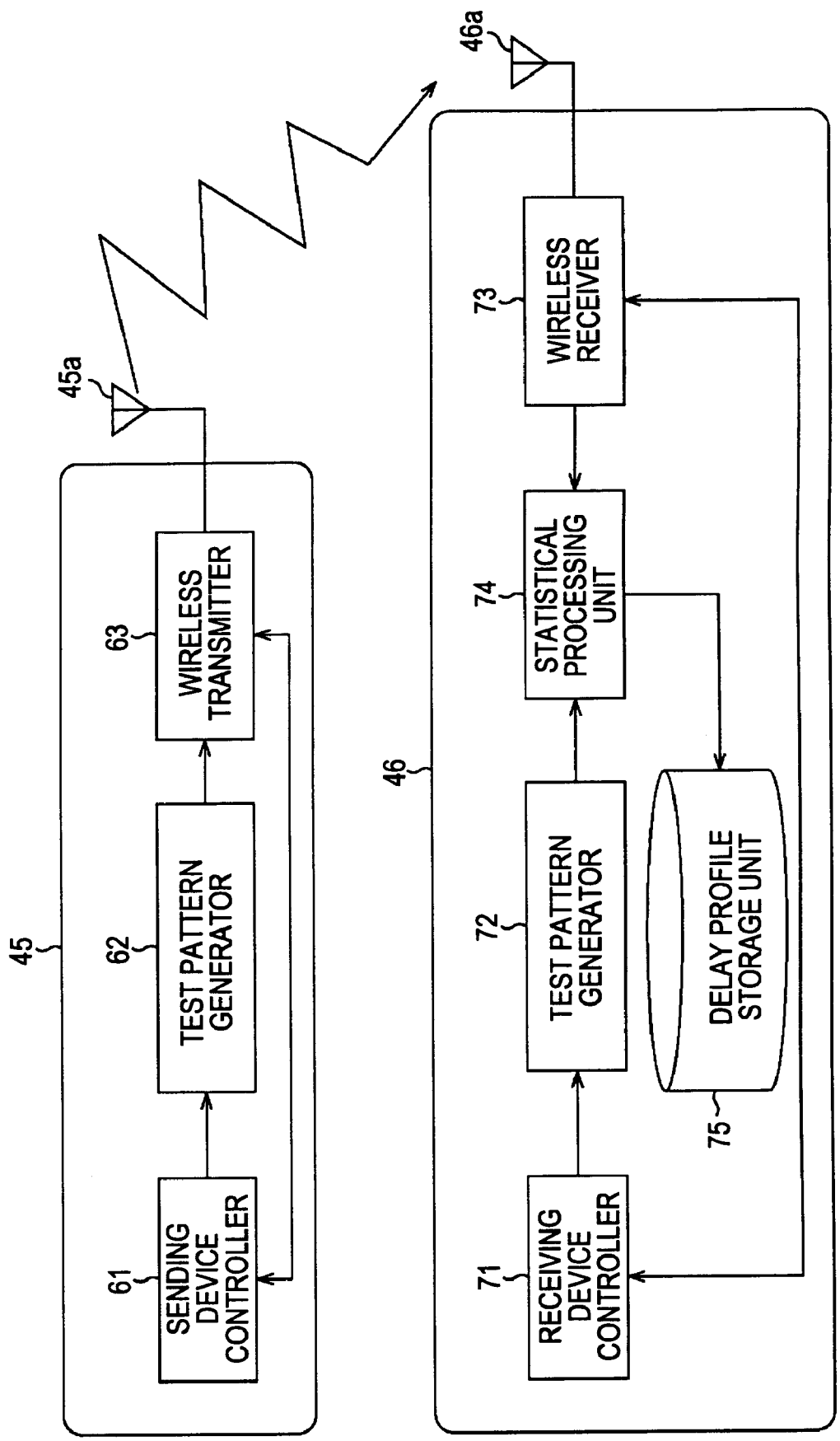
FIG. 5 is a block diagram illustrating an example of a configuration of a signal router and an example of a configuration of a functional block.

FIG. 5 is a block diagram illustrating an example of a configuration of the signal router 45 and an example of a configuration of the functional block 46 shown in FIG. 3. Note that in FIG. 5, only blocks necessary for the signal router 45 to transmit a test pattern signal to the functional block 46, and block necessary for the functional block 46 to acquire a delay profile are shown.

In FIG. 5, the signal router 45 includes an antenna 45a, a sending device controller 61, a test pattern generator 62, and a wireless transmitter 63. The functional block 46 includes an antenna 46a, a receiving device controller 71, a test pattern generator 72, a wireless receiver 73, a statistical processing unit 74, and a delay profile storage unit 75.

The sending device controller 61 controls the test pattern generator 62 to generate a test pattern signal, and controls the wireless transmitter 63 to transmit the test pattern signal generated by the test pattern generator 62 to the functional block 46. For example, in the case where the test pattern signal is formed to include 7 bits, the sending device controller 61 controls the test pattern generator 62 to generate 7 test pattern signals such as those described above. Taking into account influences of noise in an ambient environment, the sending device controller 61 transmits the same test pattern signal a predetermined number of times.

The sending device controller 61 includes setting data, stored in advance therein, indicating combinations of bits used in the test pattern signals, the order of transmitting the test pattern signals, and the number of times each test pattern signal is transmitted.

Before the sending device controller 61 starts transmission of the test pattern signals, the sending device controller 61 transmits, via the wireless transmitter 63, a control signal (a command) to request to start the delay profile acquisition process to the functional block 46.

In the case where a signal such as an image signal is transmitted at a high transmission rate, each bit is transmitted in a short period, and thus multiple transmission paths have a large influence on distortion of the signal, which leads to a large influence on the determination of bits represented by the signal. In contrast, in the case where a signal such as a control signal to start a process is transmitted at a low transmission rate, a rather long period is assigned to each bit and thus multiple transmission paths have a small influence on distortion of the signal and have a small influence on the determination of bits represented by the signal. Therefore, when the sending device controller 61 transmits a control signal by wireless communication, if the transmission rate is low enough, the functional block 46 can correctly receive the control signal.

Alternatively, the sending device controller 61 may be connected to the receiving device controller 71 via a control bus (not shown) whereby the sending device controller 61 may transmit the control signal to the receiving device controller 71 via the control bus.

Under the control of the sending device controller 61, the test pattern generator 62 generates a test pattern signal and supplies it to the wireless transmitter 63.

The wireless transmitter 63 transmits the control signal supplied from the sending device controller 61 or the test pattern signal supplied from the test pattern generator 62 to the functional block 46 via the antenna 45a.

The wireless receiver 73 receives the control signal or the test pattern signal transmitted from the signal router 45 via the antenna 46a. The received control signal is transferred to the receiving device controller 71. The wireless receiver 73 extracts the signal value of the current bit from the test pattern signal transmitted from the signal router 45, and the wireless receiver 73 supplies the extracted signal value to the statistical processing unit 74.

The receiving device controller 71, as with the sending device controller 61, includes setting data, stored in advance therein, indicating combinations of bits used in the test pattern signals, the order of transmitting the test pattern signals, and the number of times each test pattern signal is transmitted. If the receiving device controller 71 receives, from the signal router 45 via the wireless receiver 73, a control signal indicating that the delay profile acquisition process should be started, the receiving device controller 71 controls the test pattern generator 72 to generate a test pattern signal in accordance with the setting.

Under the control of the receiving device controller 71, the test pattern generator 72 generates the test pattern signal and supplies it to the statistical processing unit 74.

If the statistical processing unit 74 receives, from the signal router 45 via the wireless receiver 73, the signal value of the current bit of the test pattern, the statistical processing unit 74 acquires a delay profile based on the signal value of the current bit.

As described above, the signal router 45 transmits the same test pattern signal the predetermined number of times, and thus the statistical processing unit 74 receives the signal value of the current bit via the wireless receiver 73 the predetermined number of times. The statistical processing unit 74 performs statistical processing on the predetermined number of signal values of the current bit, for example, to determine the average values of the signal values. The statistical processing unit 74 employs the average value as the delay profile.

The receiving device controller 71 controls the test pattern generator 72 to generate the test pattern signal in accordance with the same setting as that used in the generation of the test pattern signal by the test pattern generator 62 under the control of the sending device controller 61. Therefore, the values of bits of the test pattern signal used by the statistical processing unit 74 in the acquisition of the delay profile are equal to the values of bits of the test pattern signal supplied to the statistical processing unit 74 from the test pattern generator 72. Thus, the statistical processing unit 74 supplies the delay profile acquired by the statistical processing unit 74 to the delay profile storage unit 75 together with the test pattern signal supplied from the test pattern generator 72.

The delay profile storage unit 75 stores the delay profile supplied from the statistical processing unit 74 in association with the test pattern signal.

Figure 6:
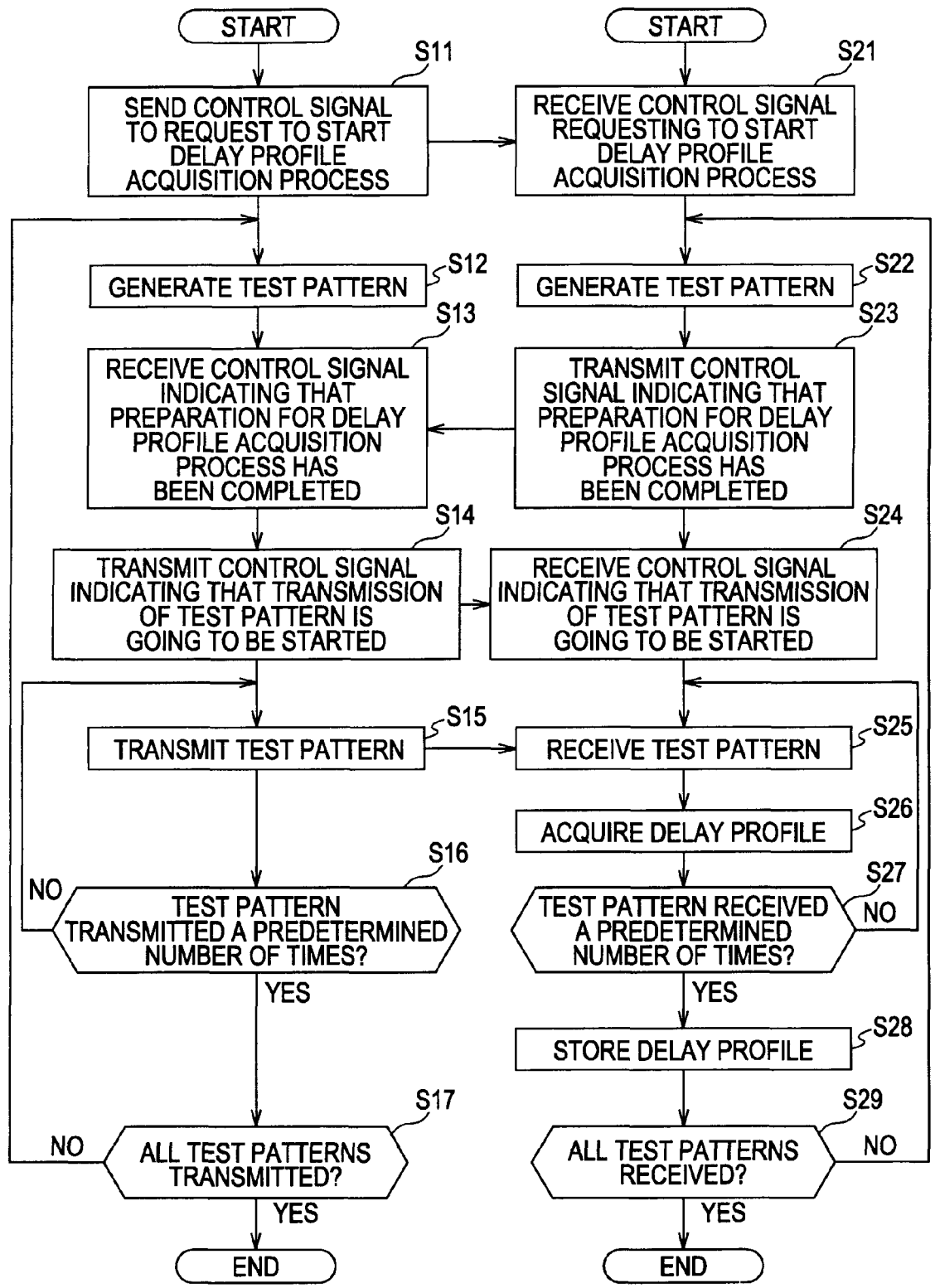
FIG. 6 is a flow chart illustrating a process in which a signal router transmits a test pattern signal and a functional block acquires a delay profile.

FIG. 6 is a flow chart illustrating a process in which the signal router 45 shown in FIG. 5 transmits the test pattern signal and the functional block 46 acquires the delay profile.

For example, when the signal processing apparatus 31 shown in FIG. 3 is set such that the delay profile acquisition process is performed when the signal processing apparatus 31 is started.

If a user turns on the power of the signal processing apparatus 31 to start the signal processing apparatus 31, the process shown in FIG. 6 is started. In step S11, the sending device controller 61 of the signal router 45 sends, to the wireless transmitter 63, a control signal (a command) indicating that the delay profile acquisition process should be started. The wireless transmitter 63 transmits the received control signal to the functional block 46.

After step S11, the process proceeds to step S12. In step S12, the sending device controller 61 controls the test pattern generator 62 to generate a test pattern signal specified as to be transmitted first. Under the control of the sending device controller 61, the test pattern generator 62 generates the test pattern signal and supplies it to the wireless transmitter 63. The process then proceeds to step S13.

In step S13, the sending device controller 61 waits until a control signal, indicating that preparation for the delay profile acquisition process is completed, is received from the functional block 46. If the functional block 46 transmits the control signal indicating that preparation for the delay profile acquisition process is completed (in step S23 which will be described later), and if the wireless transmitter 63 receives the control signal and transfers it to the sending device controller 61, then the process proceeds to step S14.

In step S14, the sending device controller 61 supplies, to the wireless transmitter 63, the control signal indicating that the transmission of the test pattern signal is going to be started, and the wireless transmitter 63 transmits the received control signal to the functional block 46.

After step S14, the process proceeds to step S15. In step S15, the sending device controller 61 controls the wireless transmitter 63 to transmit the test pattern signal generated in step S12 by the test pattern generator 62 to the functional block 46.

After step S15, the process proceeds to step S16. In step S16, the sending device controller 61 determines whether the test pattern signal has been transmitted to the functional block 46 in step S15 the predetermined number of times.

In a case where the sending device controller 61 determines in step S16 that the test pattern signal has not yet been transmitted to the functional block 46 in step S15 the predetermined number of times, the process returns to step S15. On the other hand, in a case where the sending device controller 61 determines in step S16 that the test pattern signal has been transmitted to the functional block 46 in step S15 the predetermined number of times, the process proceeds to step S17.

That is, the sending device controller 61 repeats the transmission of the test pattern signal until it is determined that the test pattern signal has been transmitted to the functional block 46 the predetermined number of times.

In step S17, the sending device controller 61 determines whether the transmission of test pattern signals to the functional block 46 is completed for all test pattern signals. For example, in a case where each test pattern signal includes 7 bits, the sending device controller 61 determines whether the transmission of test pattern signals to the functional block 46 is completed for all 7 test pattern signals.

In a case where the sending device controller 61 determines in step S17 that the transmission of test pattern signals to the functional block 46 has not been completed for all test pattern signals, the process returns to step S12 to repeat the above-described process from step S12. In this case, in step S12, the sending device controller 61 controls the test pattern generator 62 to generate a test pattern signal specified as to be transmitted next after completion of transmission of the previous test pattern signal.

In a case where the sending device controller 61 determines in step S17 that the transmission of test pattern signals to the functional block 46 has been completed for all test pattern signals, the process of the signal router 45 is ended.

Meanwhile, the functional block 46 is waiting for arrival of the control signal indicating that the delay profile acquisition process should be started, from the signal router 45. If the signal router 45 transmits in step S11 the control signal indicating that the delay profile acquisition process should be started, then in step S21, the wireless receiver 73 receives this control signal and transfers it to the receiving device controller 71.

After step S21, the process proceeds to step S22. In step S22, the receiving device controller 71 controls the test pattern generator 72 to generate the same test pattern signal as that specified as to be transmitted first from the signal router 45. Under the control of the sending device controller 71, the test pattern generator 72 generates the test pattern signal and supplies it to the statistical processing unit 74. At this stage, the preparation for acquisition of the delay profile is completed, and thus the process proceeds to step S23.

In step S23, the receiving device controller 71 supplies, to the wireless receiver 73, a control signal indicating that the preparation for the delay profile acquisition process is completed. The wireless receiver 73 transmits the control signal to the signal router 45.

After step S23, the process proceeds to step S24. In step S24, the functional block 46 waits until the control signal indicating that the transmission of the test pattern signal is going to be started is received from the signal router 45. If the signal router 45 transmits in step S14 the control signal indicating that the transmission of the test pattern signal is going to be started, the wireless receiver 73 receives this control signal and transfers it to the receiving device controller 71. The process then proceeds to step S25.

In step S25, the wireless receiver 73 waits until the wireless receiver 73 receives the test pattern signal from the signal router 45. If the signal router 45 transmits in step S15 the test pattern signal, the wireless receiver 73 receives this test pattern signal. The wireless receiver 73 extracts the signal value of the current bit from the test pattern signal transmitted from the signal router 45, and the wireless receiver 73 supplies the extracted signal value to the statistical processing unit 74. The process then proceeds to step S26.

In step S26, the statistical processing unit 74 acquires a delay profile based on the signal value of the current bit supplied in step S25 from the wireless receiver 73.

If the signal value of the current bit received from the wireless receiver 73 is the signal value of the current bit of the first-time transmission of the test pattern signal from the signal router 45, the statistical processing unit 74 simply acquires the received signal value of the current bit as the delay profile. On the other hand, in a case where the signal value of the current bit received from the wireless receiver 73 is the signal value of the current bit of the second-time or following transmission of the test pattern signal from the signal router 45, the statistical processing unit 74 determines the average value of the newly received signal value of the current bit and the already acquired delay profile, and employs the result as a new delay profile.

After step S26, the process proceeds to step S27. In step S27, the receiving device controller 71 determines whether the same test pattern signal as that received in the previous step S25 has already been received the predetermined number of times.

In a case where the receiving device controller 71 determines in step S27 that the same test pattern signal as that received in the previous step S25 has not yet been received the predetermined number of times, the processing flow returns to step S25 to repeat the above-described process from step S25.

In a case where the receiving device controller 71 determines in step S27 that the same test pattern signal as that received in the previous step S25 has been received the predetermined number of times, the process proceeds to step S28. In step S28, the statistical processing unit 74 stores the test pattern signal supplied in step S22 from the test pattern generator 72 in association with the delay profile acquired in step S26 in the delay profile storage unit 75.

After step S28, the process proceeds to step S29. In step S29, the receiving device controller 71 determines whether the reception of test pattern signals from the signal router 45 is completed for all test pattern signals.

In a case where the receiving device controller 71 determines in step S29 that the reception of test pattern signals from the signal router 45 is not completed for all test pattern signals, the process returns to step S22. In step S22, the receiving device controller 71 waits until a next test pattern signal is received from the signal router 45. After the next test pattern is received, the process described above is repeated.

In a case where the receiving device controller 71 determines in step S29 that the reception of test pattern signals from the signal router 45 is completed for all test pattern signals, the present process is ended.

As described above, the signal router 45 transmits the test pattern signal, while the functional block 46 receives the test pattern signal transmitted from the signal router 45 acquires the delay profile on the basis of the received test pattern signal.

Figure 7:
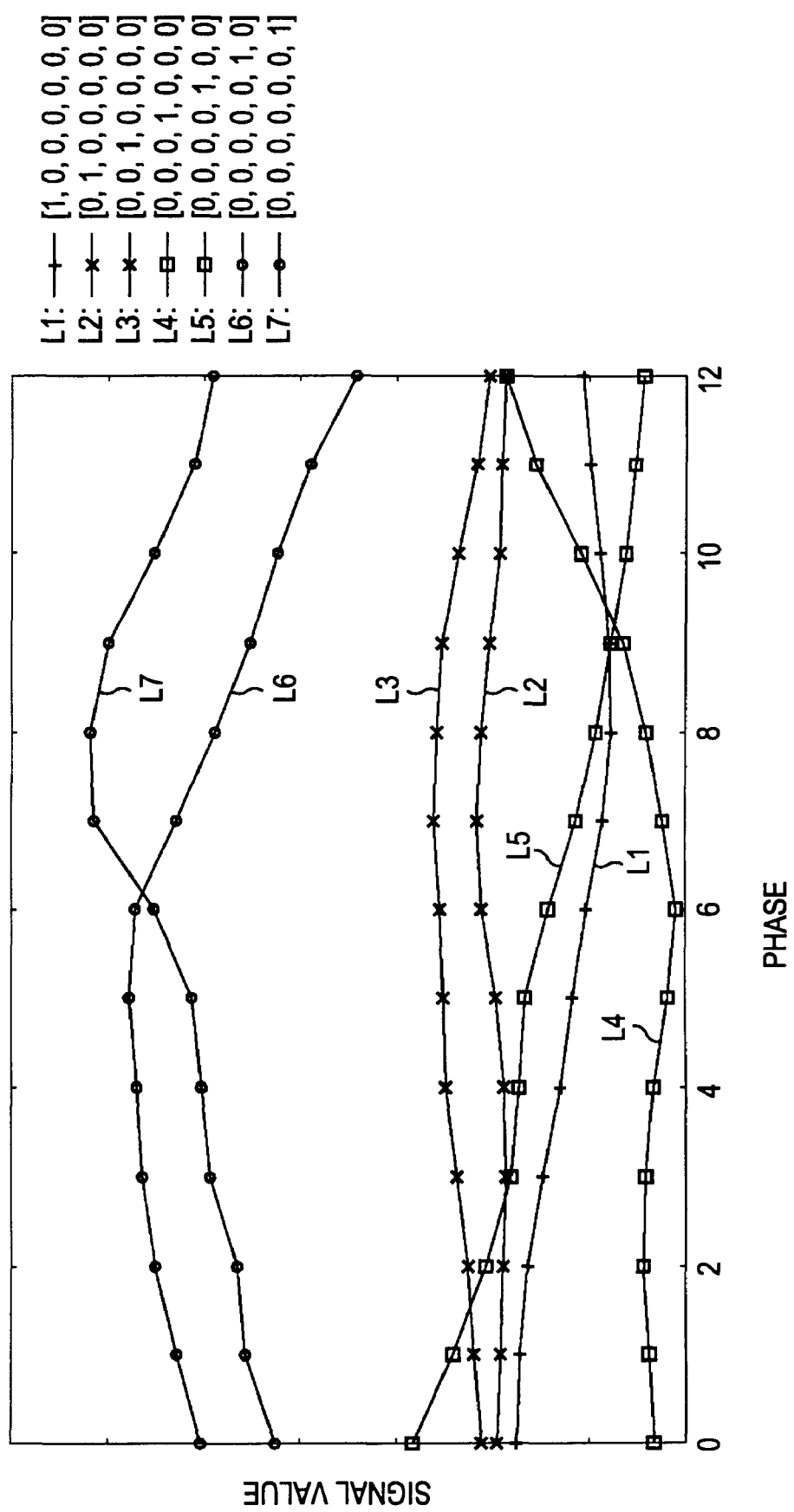
FIG. 7 illustrates an example of a delay profile acquired by a functional block.

FIG. 7 illustrates an example of a set of delay profiles acquired by the functional block 46 shown in FIG. 5.

In FIG. 7, a horizontal axis represents the phase of delay profiles, and vertical axis represents signal values of delay profiles. In FIG. 7, delay profiles L1 to L7 acquired on the basis of the 7-bit test pattern signals are shown. Herein it is assumed that the delay profiles L1 to L7 are acquired by sampling the signal value of the current bit of the test pattern signal at 13 sampling points.

In the example of a set of delay profiles shown in FIG. 7, the delay profile L1 is acquired on the basis of a test pattern signal "1, 0, 0, 0, 0, 0, 0", the delay profile L2 is acquired on the basis of a test pattern signal "0, 1, 0, 0, 0, 0, 0", the delay profile L3 is acquired on the basis of a test pattern signal "0, 0, 1, 0, 0, 0, 0", the delay profile L4 is acquired on the basis of a test pattern signal "0, 0, 0, 1, 0, 0, 0", the delay profile L5 is acquired on the basis of a test pattern signal "0, 0, 0, 0, 1, 0, 0", the delay profile L6 is acquired on the basis of a test pattern signal "0, 0, 0, 0, 0, 1, 0", and the delay profile L7 is acquired on the basis of a test pattern signal "0, 0, 0, 0, 0, 0, 1".

The functional block 46 acquires such delay profiles and, in wireless communication performed thereafter with the signal router 45, the functional block 46 predicts the signal value of the current bit for each phase on the basis of the signal value at each phase of the delay profiles and values of a plurality of bits transmitted before the current bit.

The predicted signal value $y_k$ for a phase k of the current bit is given by equation (1) shown below.

$$y_k = a_{0,k}x_0 + a_{1,k}x_1 + a_{2,k}x_2 + \ldots + a_{n,k}x_n \quad (1)$$

where $x_n$ denotes a bit transmitted n bits before the current bit, and $a_{n,k}$ denotes a signal value at a phase k of a delay profile determined on the basis of a test pattern signal for a bit of "1" transmitted n bits before the current bit.

In equation (1), a tentative value assumed for the current bit is substituted in $x_0$. By substituting 0 or 1 into $x_0$, the predicted signal value $y_k$ at the phase k of the current bit is obtained for the value of "0" or "1" assumed for the current bit.

The predicted signal values $y_0$ to $y_k$ for the phase 0 to k (0 to 12 in the example shown in FIG. 7) of the current bit are given by the following equation:

$$\begin{pmatrix} y_0 \\ \vdots \\ y_k \end{pmatrix} = \begin{pmatrix} a_{0,1} & \cdots & a_{n,1} \\ \vdots & \ddots & \\ a_{0,k} & & a_{n,k} \end{pmatrix} \cdot \begin{pmatrix} x_0 \\ \vdots \\ x_n \end{pmatrix} \quad (2)$$

In equation (2), a matrix whose elements $a_{n,k}$ indicate signal values of phase k of the delay profile is referred to as a received signal amplification prediction coefficient matrix. In the calculation of equation (1) or (2), in a case where BPSK is used as the modulation method of the wireless communication, −1" is substituted instead of "0" into x for bit values of "0", and +1" is substituted into x for bit values of "1".

Figure 8:
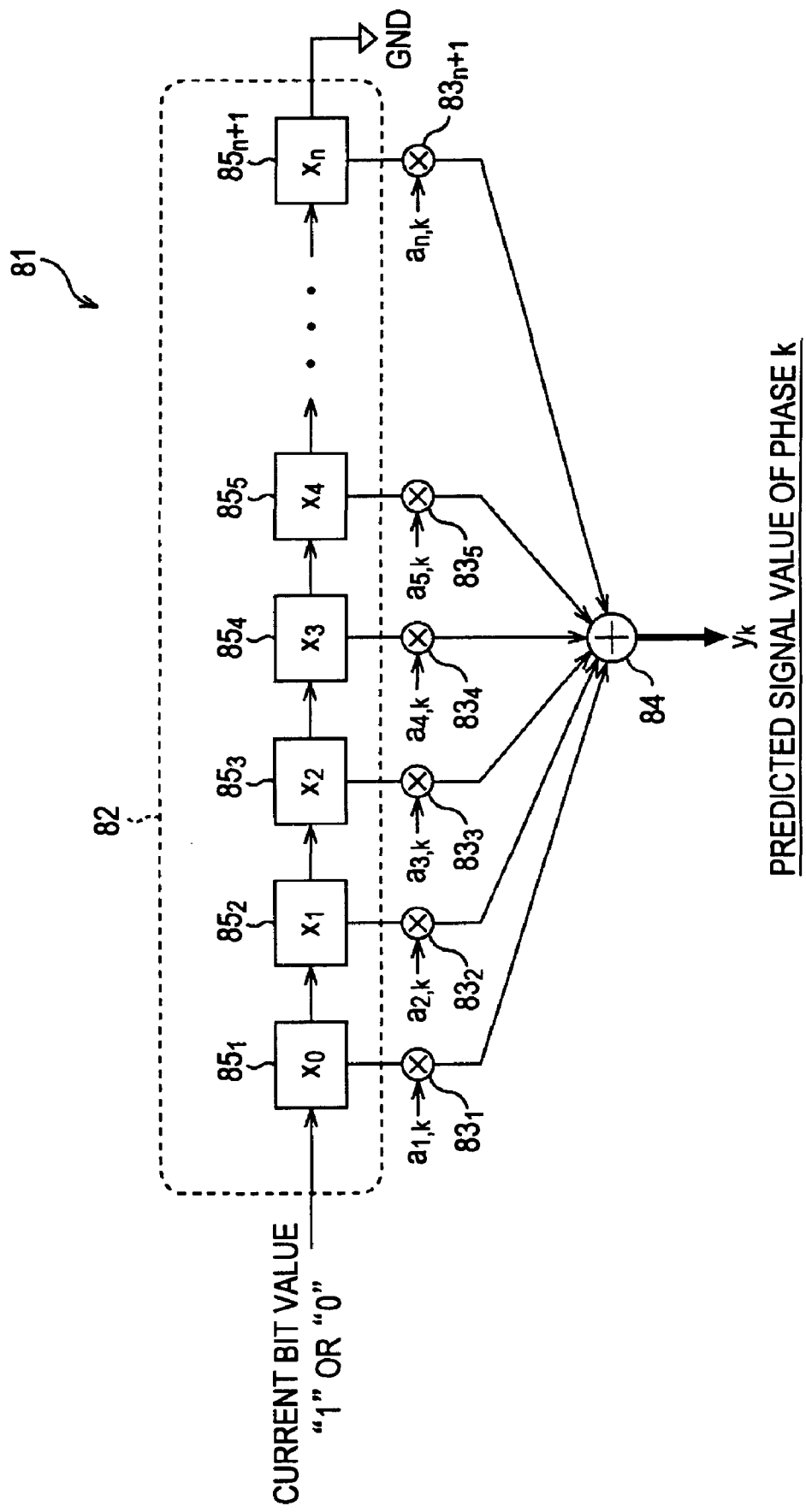
FIG. 8 illustrates an example of a configuration of a signal value predictor adapted to determine a predicted signal value $y_k$ for a phase k of a current bit.

FIG. 8 is a block diagram illustrating an example of a configuration of the signal value predictor for determining a predicted signal value $y_k$ for a phase k of the current bit.

In the example shown in FIG. 8, the signal value predictor 81 includes a shift register 82, n+1 multipliers 83₁ to 83$_{n+1}$, and an adder 84. The signal value predictor 81 calculates equation (1) determines predicted signal values $y_k$ for assumed values of "1" and "0" of the current bit by calculating equation (1).

The shift register 82 includes n+1 storage units 85₁ to 85$_{n+1}$. The storage unit 85₁ is adapted to store the current bit $x_0$, and each storage unit 85₁ in the storage units 85₂ to 85$_{n+1}$ is adapted to store bit $x_s$ which is s bits before the current bit. If a current bit value is newly input to the storage unit 85₁, bits stored in the respective storage units 85₁ to 85n are shifted into storage units 85₂ to 85$_{n+1}$.

For example, if "1" or "0" is input as the current bit $x_0$ to the shift register 82, the input value of the current bit $x_0$ is stored in the storage unit 85₁, the value of the bit $x_1$ one bit before the current bit is stored in the storage unit 85₂, the value of the bit $x_2$ two bits before the current bit is stored in the storage unit 85₃, and so on, and the value of the bit $x_n$ n bits before the current bit is stored in the storage unit 85$_{n+1}$.

The multipliers 83₁ to 83$_{n+1}$ read signal values $a_{0,k}$ to $a_{n,k}$ at phase k of the delay profile from the delay profile storage unit 75 shown in FIG. 5, and multiply bits $x_0$ to $x_n$ stored in the storage units 85₁ to 85$_{n+1}$ by the signal values $a_{0,k}$ to $a_{n,k}$. The resultant products ($a_{i,k}x_i$ (i=0, 1, . . . , n)) are supplied to the adder 84.

The adder 84 calculates the sum of the values ($a_{0,k}x_0$ to $a_{n,k}x_n$) supplied from the multipliers 83₁ to 83$_{n+1}$. The result is output as the predicted signal value $y_k$ for the phase k of the current bit.

As described above, the signal value predictor 81 determines the predicted signal value $y_k$ for the phase k of the current bit by calculating equation (1).

In the signal value predictor 81, the current bit input to the shift register 82 is sequentially transferred from the storage unit 85₁ to the storage unit 85$_{n+1}$. The true value ("1" or "0") taken by the current bit is determined on the basis of the predicted signal value $y_k$ at the phase k of the current bit determined by the signal value predictor 81, as described in further detail later. Therefore, in the determination of the predicted signal value of the current bit, values already determined based on the predicted signals can be used as values of bits one to n bits before the current bit.

Figure 9:
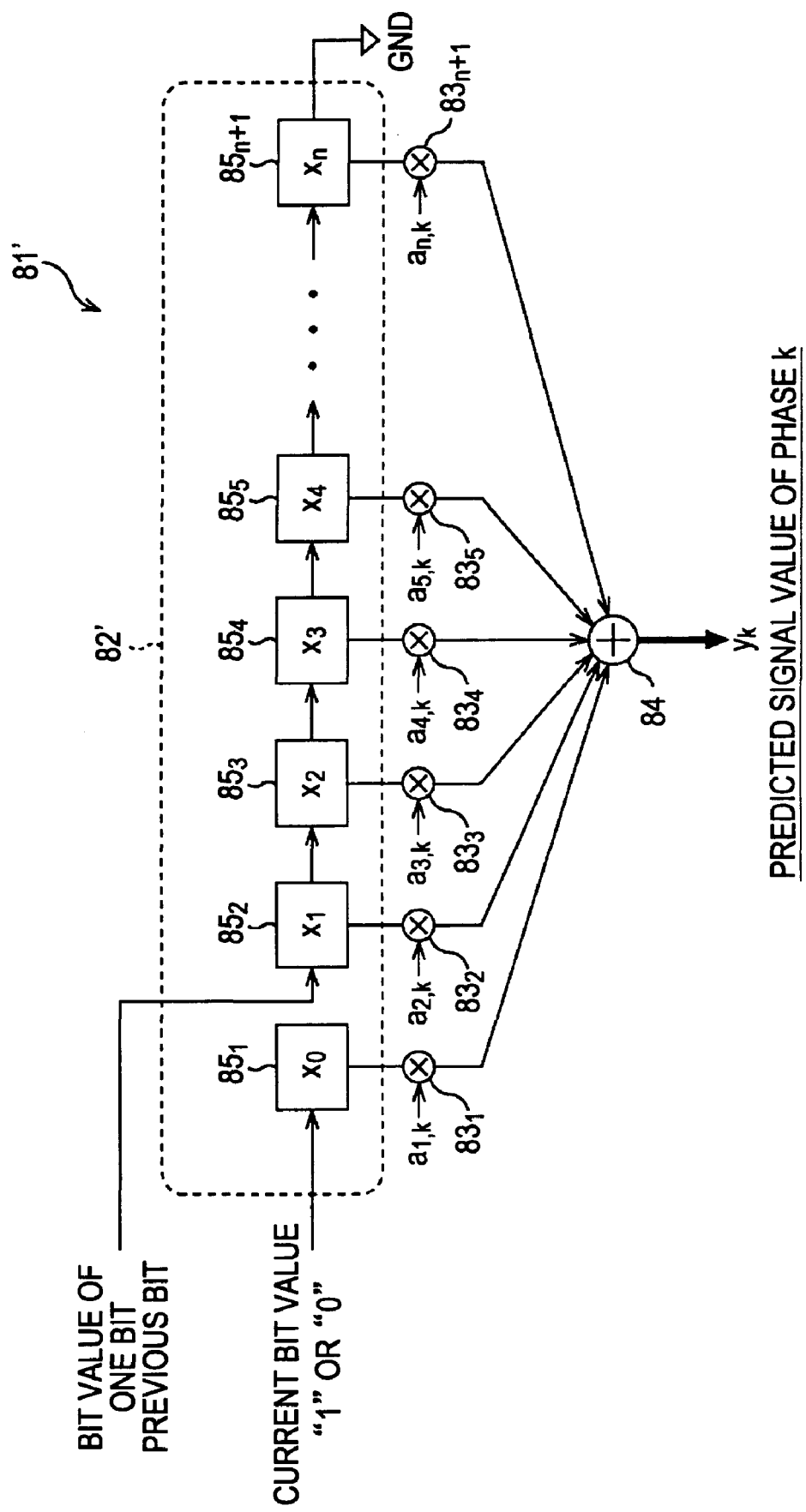
FIG. 9 is a block diagram illustrating an example of a configuration of a signal value predictor.

FIG. 9 illustrates an example of a signal value predictor configured to determine a predicted signal value of the current bit by using bits already determined based on the predicted signal values.

As shown in FIG. 9, the signal value predictor 81' includes a shift register 82', n multipliers 83₁ to 83$_{n+1}$, and an adder 84. In the signal value predictor 81', the multipliers 83₁ to 83$_{n+1}$ and the adder 84 are similar to those in the signal value predictor 81 shown in FIG. 8, and thus a duplicated explanation thereof is omitted herein.

In the signal value predictor 81', the shift register 82' is similar to the shift register 82 shown in FIG. 8 in that it has n+1 storage units 85₁ to 85_{n+1}, but different in that a bit determined based on the predicted signal value for a bit one bit before the current bit is stored in the storage unit 85₂.

In the signal value predictor 81' configured in the above-described manner, if the current bit $x_0$ is input to the storage unit 85₁, and the bit determined based on the predicted signal value for the bit one bit before the current bit is input to the storage unit 85₂, the predicted signal value $y_k$ is calculated.

More specifically, for example, if "1" is input as the current bit to the storage unit 85₁, the signal value predictor 81' determines the predicted signal value $y_k$ on the assumption that the current bit is "1". On the other hand, if "0" is input as the current bit to the storage unit 85₁, the signal value predictor 81' determines the predicted signal value $y_k$ on the assumption that the current bit is "0".

Thereafter, the signal value of the current bit actually transmitted using an electromagnetic wave is compared with the predicted signal value $y_k$ determined on the assumption that the current bit is "1" and the predicted signal value $y_k$ determined on the assumption that the current bit is "0" to determine whether the true value of the current bit actually transmitted using the electromagnetic wave is "1" or "0".

Figure 10:
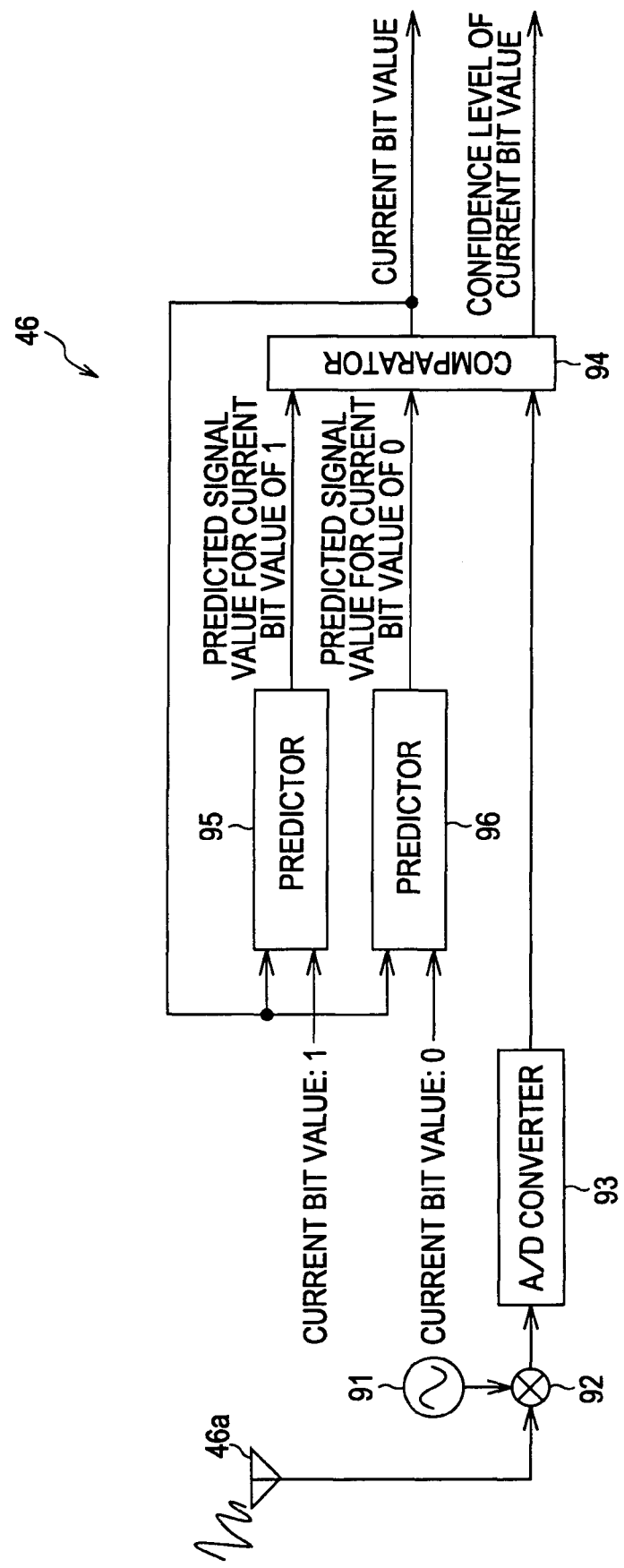
FIG. 10 is a block diagram illustrating an example of a functional block.

FIG. 10 is a block diagram illustrating an example of a configuration of the functional block 46. Note that in FIG. 10 only blocks necessary for the functional block 46 to receive a signal transmitted from the signal router 45 and determine the true value of the current bit of the signal are shown.

In the example shown in FIG. 10, the functional block 46 includes an antenna 46a, an oscillator 91, a multiplier 92, an analog-to-digital converter 93, a comparator 94, and signal value predictors 95 and 96.

The antenna 46a serves to receive a signal (RF signal) transmitted in the form of an electromagnetic wave from the signal router 45 and transfer the received signal to the multiplier 92.

The oscillator 91 generates a signal for used in converting the RF signal received by the antenna 46a into a baseband signal, and supplies the generated signal to the multiplier 92. The multiplier 92 multiplies the RF signal supplied from the antenna 46a by the signal supplied from the oscillator 91 thereby acquiring the baseband signal. The resultant baseband signal is supplied to the analog-to-digital converter 93.

The analog-to-digital converter 93 converts the baseband signal supplied from the multiplier 92 into digital form so as to acquire the digital signal value of the bit represented by the signal transmitted from the signal router 45. The analog-to-digital converter 93 sequentially supplies the signal values of the bit represented by the signal transmitted from the signal router 45 to the comparator 94.

The comparator 94 processes the signal values of the current bit sequentially supplied from the analog-to-digital converter 93. The comparator 94 also receives the predicted signal value calculated by the signal value predictor 95 on the assumption that the current bit is "1" and the predicted signal value calculated by the signal value predictor 96 on the assumption that the current bit is "0".

The comparator 94 calculates the difference $\delta_1$ between the signal value of the current bit supplied from the analog-to-digital converter 93 and the predicted signal value calculated by the signal value predictor 95 on the assumption that the current bit is "0", and also calculates the difference $\delta_0$ between the signal value of the current bit supplied from the analog-to-digital converter 93 and the predicted signal value calculated by the signal value predictor 96 on the assumption that the current bit is "0".

The comparator 94 compares the difference $\delta_1$ with the difference $\delta_0$ and selects the value used as the assumed value of the current bit in the calculation of the predicted signal value corresponding to the difference determined to be the smaller of the two differences. The comparator 94 regards the selected value as the true value of the current bit and outputs it. The comparator 94 also outputs the smaller one of the two differences $\delta_1$ and $\delta_0$ as a value indicating the confidence level of the value determined as the current bit determined by the comparator 94. The confidence level may be used in a process performed after the determination of the bit value or in other processes such as an encoding/decoding process of an image signal.

The signal value predictors 95 and 96 each include a signal value predictor 81' configured as shown in FIG. 9. A bit determined by the comparator 94 on the basis of a predicted signal value for a bit one bit before the current bit is input in the storage unit 85₂ in the signal value predictor 81' of each of the signal value predictors 95 and 96.

"1" is input in the storage unit 85₁ of the signal value predictor 81' of the signal value predictor 95. In response, the signal value predictor 95 calculates the predicted signal value on the assumption that the current bit is "1", and supplies the result to the comparator 94. On the other hand, "0" is input in the storage unit 85₁ of the signal value predictor 81' of the signal value predictor 96. In response, the signal value predictor 96 calculates the predicted signal value on the assumption that the current bit is "0", and supplies the result to the comparator 94.

FIG. 11 is a flow chart illustrating a process performed by the functional block 46 shown in FIG. 10 to determine the current bit of the signal.

If the signal router 45 transmits a signal and if the antenna 46a of the functional block 46 shown in FIG. 10 detects this signal, then, in step S41, the multiplier 92 multiplies the signal received by the antenna 46a by the signal generated by the oscillator 91 thereby acquiring a baseband signal. The multiplier 92 supplies the acquired baseband signal to the analog-to-digital converter 93. Thereafter, the process proceeds to step S42.

In step S42, the analog-to-digital converter 93 converts the baseband signal supplied from the multiplier 92 into a digital form, and supplies the resultant digital signal value of the bit of the signal to the comparator 94.

In step S43, the signal value predictor 95 calculates a predicted signal value on the assumption that the true value of the current bit is "1" and supplies the resultant predicted signal value to the comparator 94.

After step S43, the process proceeds to step S44. In step S44, the signal value predictor 96 calculates a predicted signal value on the assumption that the true value of the current bit is "0" and supplies the resultant predicted signal value to the comparator 94. The process then proceeds to step S45.

In step S45, the comparator 94 calculates the difference 61 between the predicted signal value calculated by the signal value predictor 95 on the assumption that the current bit is "1" and supplied in step S43 from the signal value predictor 95, and the signal value of the current bit supplied in step S42 from the analog-to-digital converter 93.

After step S45, the process proceeds to step S46. In step S46, the comparator 94 calculates the difference $\delta_0$ between the predicted signal value calculated by the signal value predictor 96 on the assumption that the current bit is "0" and supplied in step S44 from the signal value predictor 96, and the signal value of the current bit supplied in step S42 from the analog-to-digital converter 93. The process then proceeds to step S47.

In step S47, the comparator 94 compares the square of the difference $\delta_1$ with the square of the difference $\delta_0$, and determines whether the square of the difference $\delta_0$ is equal to or smaller than the square of the difference $\delta_1$.

In a case where the comparator 94 determines in step S47 that the square of the difference $\delta_0$ is equal to or smaller than the square of the difference $\delta_1$, the process proceeds to step S48. In step S48, the comparator 94 determines that the true value of the current bit is "0".

On the other hand, in a case where the comparator 94 determines in step S47 that the square of the difference $\delta_0$ is not equal to or smaller than (i.e., greater than) the square of the difference $\delta_1$, the process proceeds to step S49. In step S49, the comparator 94 determines that the true value of the current bit is "1".

After step S48 or step S49, the processing flow returns to step S43 to repeat the above-described process for a next bit supplied from the analog-to-digital converter 93.

As described above, the functional block 46 correctly determines the true value of the current bit on the basis of the signal value of the current bit transmitted from the signal router 45, the predicted signal value calculated on the assumption that the current bit is "1", and the predicted signal value calculated on the assumption that the current bit is "0".

The correct determination of bits represented by the signal leads to an improvement in quality of wireless communication performed in the case 32 of the signal processing apparatus 31.

To achieve high reliability in data In wireless communication systems other than that according to the present embodiment of the invention, data is divided into a plurality of blocks and data is transmitted from a transmitting end together with error correction code added to each block. In a receiving end, if an error is detected in a block, the error is corrected using the error correction code, and the original signal is reproduced from the blocks.

In contrast, in the signal processing apparatus 31 according to the present embodiment of the invention, true values of bits can be determined using delay profiles, and thus high-reliability communication is achieved simply by transmitting a sequence of bits from the signal router 45 and simply receiving the transmitted sequence of bits by the functional block 46 and determining the true values of the bits. This makes it possible to easily satisfy the requirement in terms of real-time operation in communication. Besides, because it is not necessary to perform the error correction process, the apparatus can be configured in a simple form.

Because the signal processing apparatus 31 is configured such that a sequence of signal bits is transmitted in a similar manner to a signal processing apparatus configured to transmit signals via a signal cable, an inter-board harness or connector used in a conventional signal processing apparatus can be easily replaced by a wireless communication system using the signal processing apparatus 31. The production of the signal processing apparatus 31 does not includes a harness connection process which is necessary in production of the conventional signal processing apparatus.

Although in the above explanation, it is assumed that a signal is transmitted from the signal router 45 to the functional block 46, the invention can also be applied to a case where a signal is transmitted from the functional block 46 to the signal router 45 or a signal is transmitted between different functional blocks 46. The invention makes it possible to correctly determine the value of the current bit in such cases.

In the embodiment described above, the comparator 94 determines the value of the current bit on the basis of the differences $\delta_1$ and $\delta_1$. Alternatively, the value of the current bit may be determined by comparing the signal value of the current bit with a threshold value given by the average of the predicted signal value determined on the assumption that the current bit is "1" and the predicted signal value determined on the assumption that the current bit is "0".

Figure 12:
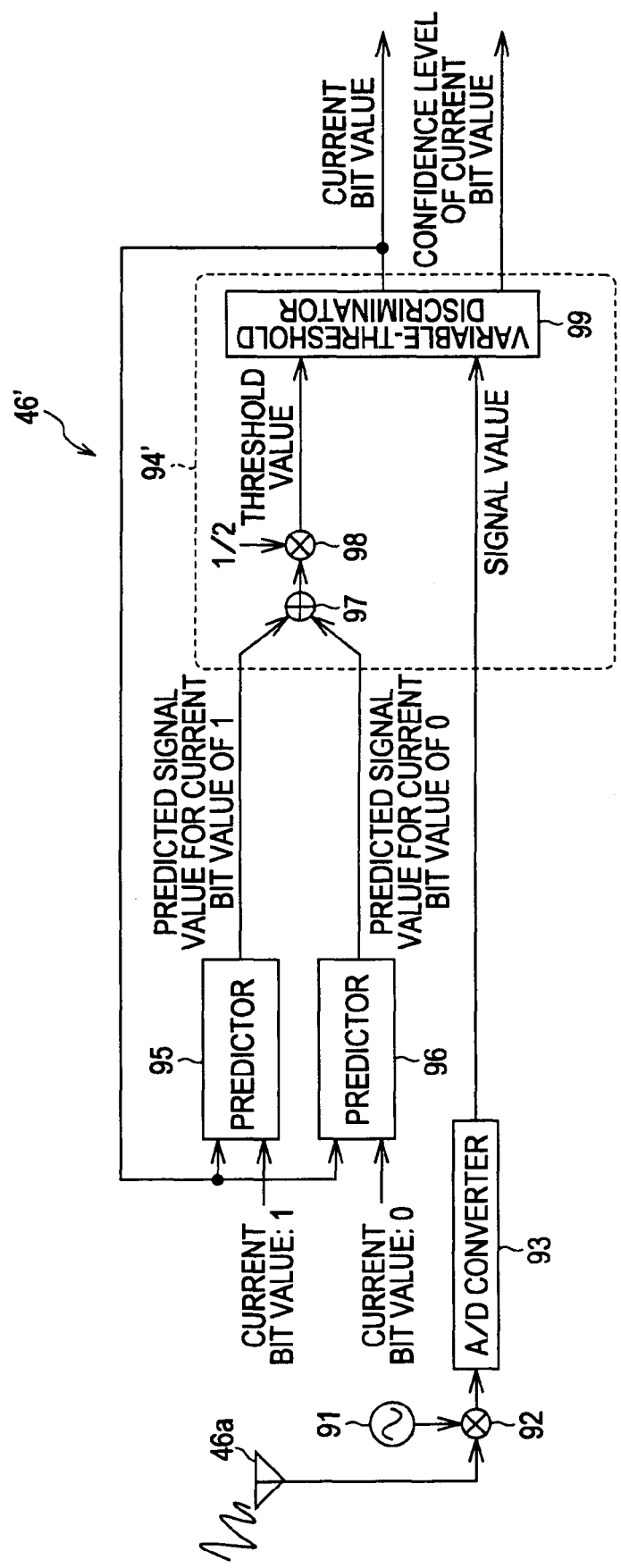
FIG. 12 is a block diagram illustrating an example of a functional block.

FIG. 12 is a block diagram illustrating an example of a functional block configured to determine the value of the current bit by comparing the signal value of the current bit with the threshold value given by the average of the predicted signal value determined on the assumption that the current bit is "1" and the predicted signal value determined on the assumption that the current bit is "0".

In the configuration shown in FIG. 12, the functional block 46' includes an antenna 46a, an oscillator 91, a multiplier 92, an analog-to-digital converter 93, a comparator 94', and signal value predictors 95 and 96. The antenna 46a, the oscillator 91, the multiplier 92, the analog-to-digital converter 93, and the signal value predictors 95 and 96 are similar to those in the functional block 46 shown in FIG. 10, and thus a duplicated explanation thereof is omitted herein.

The comparator 94' includes an adder 97, a multiplier 98, and a variable threshold 99.

The adder 97 is supplied with a predicted signal value determined by the signal value predictor 95 on the assumption that the current bit is "1" and a predicted signal value determined by the signal value predictor 96 on the assumption that the current bit is "0". The adder 97 calculates the sum of the predicted signal value determined on the assumption that the current bit is "1" and the predicted signal value determined on the assumption that the current bit is "0", and supplies the resultant value to the multiplier 98.

The multiplier 98 multiplies the sum the predicted signal value determined on the assumption that the current bit is "1" and the predicted signal value determined on the assumption that the current bit is "0" by ½ thereby determining the average value of the predicted signal value determined on the assumption that the current bit is "1" and the predicted signal value determined on the assumption that the current bit is "0". The determined average value is supplied to the variable threshold 99.

The variable threshold 99 also receives the signal value of the current bit from the analog-to-digital converter 93. The variable threshold 99 employs the average value supplied from the multiplier 98 as the threshold value and determines whether the signal value of the current bit is equal to or smaller than the threshold value. The variable threshold 99 then determines that the current bit is "1" or "0" according to the result of the comparison.

More specifically, when the variable threshold discriminator 99 determines that the signal value of the current bit is equal to or smaller than the threshold value, the variable threshold discriminator 99 determines that the current bit is "0". However, when the variable threshold discriminator 99 determines that the signal value of the current bit is not equal to or smaller than the threshold value (i.e., the signal value is greater than the threshold value), the variable threshold discriminator 99 determines that the current bit is "1".

As described above, the functional block 46' changes the threshold value used in determining the value of the current bit depending on the predicted signal value calculated on the assumption that the current bit is "1" and the predicted signal value calculated on the assumption that the current bit is "0", thereby achieving higher reliability in determination of the value of the bit than can be achieved in the case where the threshold value is fixed (for example, at 0).

In the example described above, it is assumed that each test pattern signal includes 7 bits and a total of 7 patterns are used. Alternatively, a total of 128 ($=2^7$) patterns such as those shown in FIG. 13 realized by a combination of "0" or "1" for each of 7 bits may be used.

Figure 13:
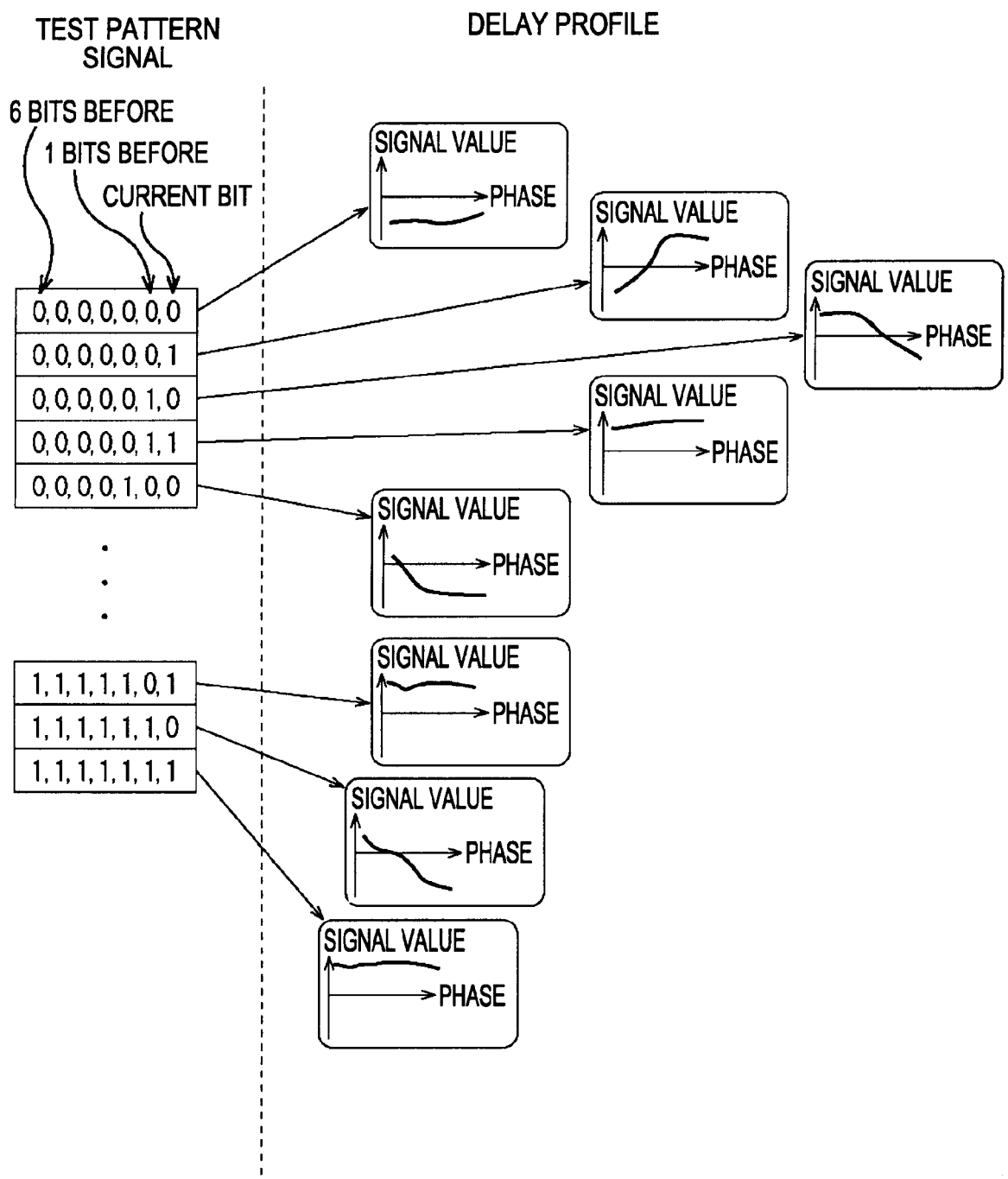
FIG. 13 illustrates examples of a test pattern signal and a delay profile.

FIG. 13 illustrates 128 test pattern signals each including 7 bits each taking "0" or "1" and also illustrates examples of delay profiles acquired using test pattern signals.

By acquiring in advance the delay profiles corresponding to the respective test pattern signals each including 7 bits each taking "0" or "1", it becomes possible to quickly and correctly determine the value of the current bit using a delay profile corresponding to a test pattern signal including the same sequence of bits as the sequence of bits actually received.

In the operation described above, when the signal processing apparatus 31 is started, the process described in the form of the flow chart shown in FIG. 6 is performed, that is, the signal router 45 transmits a test pattern and the functional block 46 acquires a delay profile. Note that if the parts in the case 32 of the signal processing apparatus 31 are disposed at fixed locations as shown in FIG. 2, no change occurs in the delay profiles and thus it is not necessary to acquire delay profiles each time the signal processing apparatus 31 is started.

However, for example, if a modification such as an addition of a new board or the like occurs in the signal processing apparatus 31, the modification can create a change in the path of the electromagnetic wave and thus a change can occur in delay profiles. In such a case, it is necessary to acquire delay profiles. In view of the above, for example, the signal router 45 and the functional block 46 shown in FIG. 5 may be configured such that when the signal processing apparatus 31 is started, a determination as to whether a change has occurred in delay profiles is made before the delay profile acquisition process is started, and the delay profile acquisition process is performed only when a change in delay profiles is detected.

Figure 14:
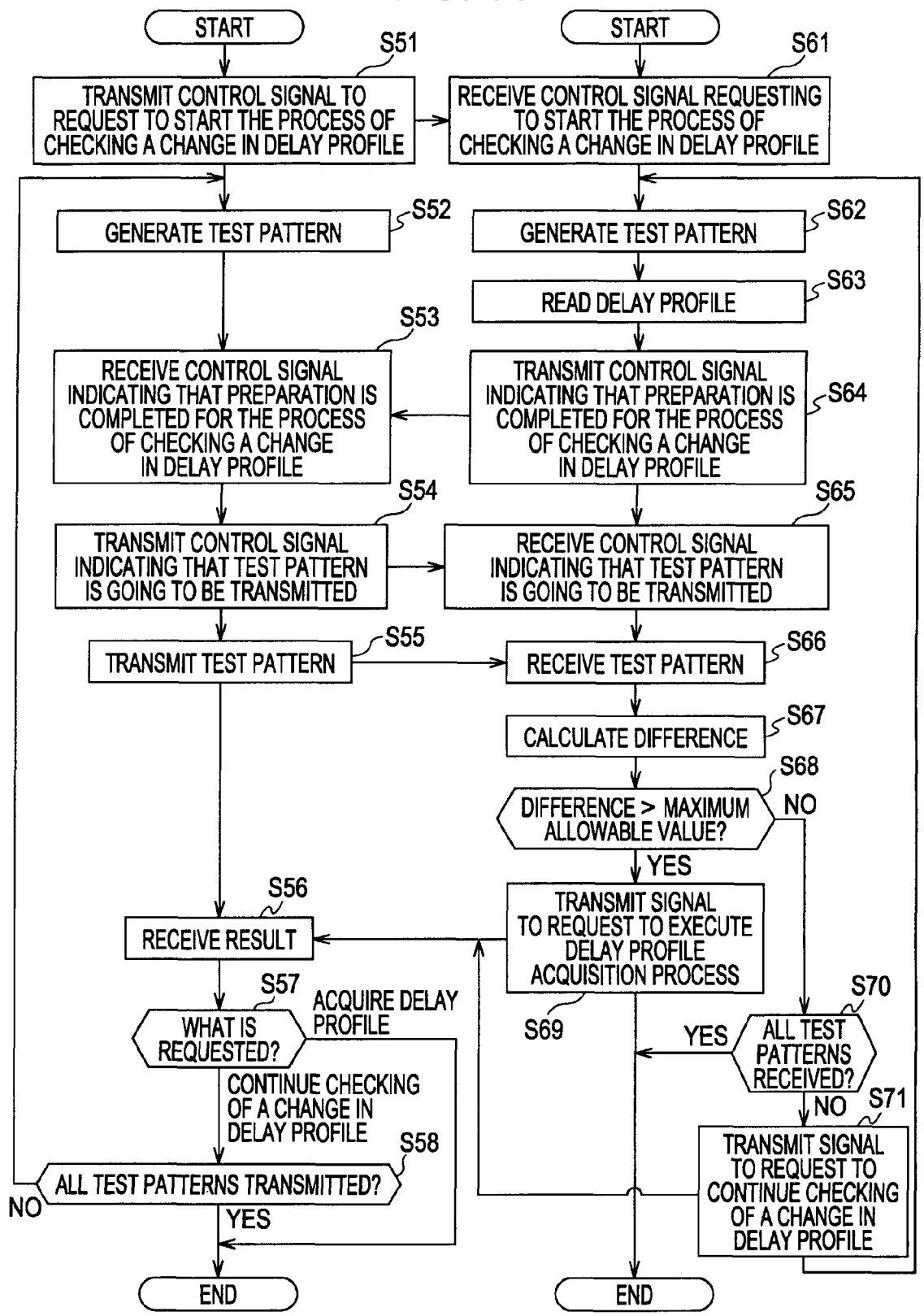
FIG. 14 is a flow chart illustrating a process of checking a change in a delay profile.

FIG. 14 is a flow chart illustrating the process of checking whether a change has occurred in delay profiles.

The process is started, for example, when a user turns on the power of the signal processing apparatus 31 to activate the signal processing apparatus 31. In step S51, the sending device controller 61 of the signal router 45 shown in FIG. 5 sends to the wireless transmitter 63 a control signal (a command) to request starting of the process of checking whether a change in delay profiles has occurred. The wireless transmitter 63 transmits the received control signal to the functional block 46.

After step S51, the process proceeds to step S52. In step S52, the sending device controller 61 controls the test pattern generator 62 to generate a test pattern signal specified as to be transmitted first. Under the control of the sending device controller 61, the test pattern generator 62 generates the test pattern signal and supplies it to the wireless transmitter 63. The process then proceeds to step S53.

In step S53, the sending device controller 61 waits until a control signal, indicating that preparation for the process of checking a change in delay profiles is completed, is received from the functional block 46. If the functional block 46 transmits the control signal indicating that preparation for the process of checking a change in delay profiles is completed (in step S64 which will be described later), and if the wireless transmitter 63 receives the control signal and transfers it to the sending device controller 61, then the process proceeds to step S54.

In step S54, the sending device controller 61 supplies, to the wireless transmitter 63, the control signal indicating that the transmission of the test pattern signal is going to be started, and the wireless transmitter 63 transmits the received control signal to the functional block 46.

After step S54, the process proceeds to step S55. In step S55, the sending device controller 61 controls the wireless transmitter 63 to transmit the test pattern signal, generated by the test pattern generator 62 and supplied to the wireless transmitter 63 in step S52, to the functional block 46.

After step S55, the process proceeds to step S56. In step S56, the sending device controller 61 waits until the functional block 46 checks whether a change has occurred in the delay profile on the basis of the test pattern signal transmitted in step S55, and a result of the check is received from the functional block 46. If the functional block 46 transmits the results of the check as to whether a change has occurred in the delay profile on the basis of the test pattern signal (in step S69 or S71 described later), and if the wireless transmitter 63 receives the result and transfers it to the sending device controller 61, the process proceeds to step S57.

In step S57, the sending device controller 61 determines whether the result received from the wireless transmitter 63 indicates that checking of change in delay profiles should be continued or the delay profile acquisition process shown in FIG. 6 should be performed.

In a case where the determination in step S57 by the sending device controller 61 is that the result received from the wireless transmitter 63 indicates that the delay profile acquisition process shown in FIG. 6 should be performed, the present process is ended the delay profile acquisition process shown in FIG. 6 is started.

On the other hand, in a case where the determination in step S57 by the sending device controller 61 is that the result received from the wireless transmitter 63 indicates that checking of change in delay profiles should be continued, the process proceeds to step S58. In step S58, the sending device controller 61 determines whether the transmission of test pattern signals to the functional block 46 is completed for all test pattern signals.

In a case where the determination in step S58 by the sending device controller 61 is that the transmission of test pattern signals to the functional block 46 has not been completed for all test pattern signals, the processing flow returns to step S52 to repeat the above-described process from step S52.

On the other hand, in a case where the determination in step S58 by the sending device controller 61 is that the transmission of test pattern signals to the functional block 46 has been completed for all test pattern signals, the process is ended. In this case, the delay profile acquisition process shown in FIG. 6 is not performed.

Meanwhile, the functional block 46 waits for arrival of the control signal indicating that the process of checking whether a change has occurred in delay profiles should be started, from the signal router 45. If the signal router 45 transmits in step S51 the control signal to request that the process of checking whether a change has occurred in delay profiles should be started, then in step S61, the wireless receiver 73 receives this control signal and transfers it to the receiving device controller 71.

After step S61, the process proceeds to step S62. In step S62, the sending device controller 71 controls the test pattern generator 72 to generate the same test pattern signal as that specified as to be transmitted first from the signal router 45. Under the control of the sending device controller 71, the test pattern generator 72 generates the test pattern signal and supplies it to the receiving device controller 71. The process then proceeds to step S63.

In step S63, the receiving device controller 71 searches the delay profile storage unit 75 to read a delay profile corresponding to the test pattern signal supplied in step S62 from the test pattern generator 72 via the test pattern generator 72 and the statistical processing unit 74. At this stage, the preparation for checking a change in delay profiles is completed, and thus the process proceeds to step S64.

In step S64, the receiving device controller 71 supplies to the wireless receiver 73 a control signal indicating that preparation for the process of checking a change in delay profiles is completed. The wireless receiver 73 transmits the supplied control signal to the signal router 45.

After step S64, the process proceeds to step S65. In step S65, the functional block 46 waits until the functional block 46 receives from the signal router 45 the control signal indicating that the transmission of the test pattern signal, for use in checking whether a change has occurred in delay profiles, is going to be started. If the signal router 45 transmits, in step S54, the control signal indicating that the transmission of the test pattern signal, for use in checking whether a change has occurred in delay profiles, is going to be started, the wireless receiver 73 receives this control signal and transfers it to the receiving device controller 71. The process then proceeds to step S66.

In step S66, the wireless receiver 73 waits until the wireless receiver 73 receives the test pattern signal from the signal router 45. If the signal router 45 transmits in step S55 the test pattern signal, the wireless receiver 73 receives this test pattern signal. The wireless receiver 73 extracts the signal value of the current bit from the test pattern signal transmitted from the signal router 45, and supplies it to the receiving device controller 71. The process then proceeds to step S67.

In step S67, the receiving device controller 71 calculates the difference between the signal value of the current bit supplied in step S66 from the wireless receiver 73 and the delay profile read in step S63 from the delay profile storage unit 75. If a change has occurred in the delay profile, a large difference is detected. On the other hand, if there is no change in the delay profile, the difference calculated in step S67 is equal to 0 or is very small.

After step S67, the process proceeds to step S68. In step S68, the receiving device controller 71 determines whether the difference calculated in step S68 is greater than a predetermined maximum allowable value.

In a case where the receiving device controller 71 determines in step S68 that the difference calculated in step S68 is greater than the predetermined maximum allowable value, that is, in a case where it is determined that there is a change in the delay profile, the process proceeds to step S69. In step S69, the receiving device controller 71 controls the wireless receiver 73 to transmit a message indicating that a change in the delay profile is detected and thus the delay profile acquisition process shown in FIG. 6 should be performed. The process is then ended.

In a case where the receiving device controller 71 determines in step S68 that the difference calculated in step S68 is not greater than (i.e., equal to or smaller than) the predetermined maximum allowable value, the process proceeds to step S70. In step S70, the receiving device controller 71 determines whether the transmission of test pattern signals from the signal router 45 is completed for all test pattern signals.

In a case where the receiving device controller 71 determines in step S70 that the transmission of test pattern signals from the signal router 45 is not completed for all test pattern signals, the process proceeds to step S71.

In step S71, the receiving device controller 71 controls the wireless receiver 73 to transmit, to the signal router 45, a message indicating that it has been determined as the result of the check as to the change in delay profiles that the check as to the change in delay profiles should be continued. The processing flow returns to step S62 to repeat the above-described process from step S62.

On the other hand, in a case where the receiving device controller 71 determines in step S70 that the transmission of test pattern signals from the signal router 45 is completed for all test pattern signals, the process is ended.

As described above, the process of checking a change in delay profiles makes it possible to detect a change in delay profiles caused by a modification such as an addition of a new board or the like to the signal processing apparatus 31, and acquire a new delay profile by performing the delay profile acquisition process shown in FIG. 6. Thus, even if a modification such as an addition of a new board or the like occurs in the signal processing apparatus 31, it is possible to perform high-quality wireless communication among boards in the case 32 of the signal processing apparatus 31.

By performing the delay profile acquisition process only when a change in delay profiles is detected, the startup time can be reduced compared with the case where delay profiles are acquired each time the signal processing apparatus 31 is started.

The sequence of processing steps described above may be performed by means of hardware or software. When the processing sequence is executed by software, a program forming the software may be installed from a program storage medium onto a computer which is provided as dedicated hardware or may be installed onto a general-purpose computer capable of performing various processes in accordance with various programs installed thereon.

FIG. 15 is a block diagram illustrating an example of a personal computer configured to execute a program to perform the sequence of processing steps described above. A CPU (Central Processing Unit) 101 performs various processes in accordance with a program stored in a ROM (Read Only Memory) 102 or a storage unit 108. A RAM (Random Access Memory) 103 stores the program executed by the CPU 101 and also stores data used in the execution of the program. The CPU 101, the ROM 102, and the RAM 103 are connected to each other via a bus 104.

An input/output interface 105 is connected to the CPU 101 via the bus 104. The input/output interface 105 is also connected to an input unit 106 including a keyboard, a mouse, a microphone and the like and an output unit 107 including a display and a speaker. The CPU 101 performs various processes in accordance with commands input via the input unit 106 and outputs results of the processes to the output unit 107.

The storage unit 108 connected to the input/output interface 105 is realized, for example, by a hard disk and is adapted to store programs and data executed or used by the CPU 101. A communication unit 109 is adapted to communicate with an external apparatus via a network such as the Internet or a local area network.

The program may be acquired via the communication unit 109 and the acquired program may be stored in the storage unit 108.

When a removable medium 111 such as a magnetic disk, an optical disk, a magneto-optical disk or a semiconductor memory is mounted on a drive 110 connected to the input/output interface 105, the drive 110 drives the mounted removable medium 111 and acquires a program or data stored thereon. The acquired program or data is transferred, as required, to the storage unit 108 and stored therein.

The removable medium 111 shown in FIG. 15 is an example of a program storage medium usable for storing a computer-executable program to be installed in the computer. Specific examples of removable media for this purpose include a magnetic disk (such as a floppy disk), an optical disk (such as a CD-ROM (Compact Disk-Read Only Memory) and a DVD (Digital Versatile Disk)), a magneto-optical disk, and a semiconductor memory. A program may be stored temporarily or permanently in the ROM 102 or in the storage unit 108 such as a hard disk or the like. The program may be stored in the program storage medium via a wire communication medium such as a local area network or the Internet or via a wireless communication medium such as digital broadcasting, using the communication unit 109 serving as an interface such as a router or a modem.

The present invention is applicable not only to an apparatus using a modulating/coding method in which one bit is transmitted by one symbol, but also to other modulating/coding methods such as a QPSK (quadrature phase shift keying) or a 8PSK (quadrature phase shift keying) method in which a plurality of bits are transmitted by one symbol.

The present invention is applicable not only to wireless communication in a case of a signal processing apparatus but also to wireless communication in an open-air circumstance as long as delay profiles are fixed. In a communication system in which a signal is transmitted via a cable, reflection of the signal at an end of the cable can occur the reflected signal can interfere with the signal propagating in a forward direction. Because such interference occurs in a stationary manner, it is possible to improve communication quality by applying the present invention to such a communication system.

In a near-field transmission system using a magnetic field, a limited communication range leads to a restriction on locations of antennas used in communication. The signal processing apparatus 31 provides high-quality communication without being subjected to the restriction on locations of antennas.

In the present invention, the processing steps described above with reference to the flow charts are not necessarily required to be executed in time sequence according to the order described in the flow charts. Instead, the processing steps may be performed in parallel or separately (by means of parallel processing or object processing).

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus adapted to process a signal transmitted via a transmission path in which a signal value of a specific symbol is influenced in a stationary manner by signal values of a plurality of symbols transmitted before the transmission of the specific symbol, comprising:

acquisition means for acquiring the signal value of the specific symbol from a signal transmitted via the transmission path;

prediction means for predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol;

determination means for determining the value taken by the specific symbol, on the basis of the signal value of the specific symbol acquired by the acquisition means and the predicted values given by the prediction means for respective values allowed to be taken by the specific symbol, receiving means for receiving a test signal including a plurality of symbols taking predetermined values; and characteristic acquisition means for acquiring a characteristic of an influence of a signal value of a symbol, included in the symbols of the test signal, transmitted before the transmission of the specific symbol on the signal value of the specific value, on the basis of the signal value of the specific symbol of the test signal received by the receiving means.

2. The signal processing apparatus according to claim 1, wherein the determination means determines which one of the predicted values calculated by the prediction means for respective values allowed to be taken by the specific symbol has a smallest difference from the signal value of the specific symbol acquired by the acquisition means, and the determination means employs, as the value taken by the specific symbol, the value allowed to be taken by the specific symbol and used in the prediction of the predicted value determined to have the smallest difference.

3. The signal processing apparatus according to claim 1, wherein the determination means determines the value taken by the specific symbol on the basis of a signal value at a predetermined phase of the specific symbol and on the basis of predicted values at the predetermined phase predicted for the respective values allowed to be taken by the specific symbol.

4. The signal processing apparatus according to claim 1, wherein the values allowed to be taken by the specific symbol are a first value and a second value, the prediction means calculates a first predicted value on the assumption that the first value is taken by the specific symbol and calculates a second predicted value on the assumption that the second value is taken by the specific symbol, and the determination means determines the value taken by the specific symbol depending on a result of a comparison between the signal value of the specific symbol acquired by the acquisition means with a threshold value given by the average of the first predicted value and the second predicted value.

5. The signal processing apparatus according to claim 1, wherein the receiving means receives a change-check signal for use in determining whether a change has occurred in the characteristic; and the characteristic acquisition means determines whether a change has occurred in the characteristic on the basis of the signal value of the specific symbol in the change-check signal and the already acquired characteristic, and, if a change in the characteristic is detected, the characteristic acquisition means acquires a new characteristic.

6. A method of processing a signal transmitted via a transmission path in which a signal value of a specific symbol is influenced in a stationary manner by signal values of a plurality of symbols transmitted before the transmission of the specific symbol, comprising the steps of:

acquiring the signal value of the specific symbol from a signal transmitted via the transmission path;

predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol;

determining the value taken by the specific symbol, on the basis of the signal value of the specific symbol acquired from the signal transmitted via the transmission path and on the basis of the predicted values for respective values allowed to be taken by the specific symbol, receiving with a receiver a test signal including a plurality of symbols taking predetermined values; and acquiring a characteristic of an influence of a signal value of a symbol, included in the symbols of the test signal, transmitted before the transmission of the specific symbol on the signal value of the specific value, on the basis of the signal value of the specific symbol of the test signal received by the receiver.

7. A non-transitory computer readable storage device having a program recorded theron that when executed by a computer controls a signal processing apparatus so as to process a signal transmitted via a transmission path in which a signal value of a specific symbol is influenced in a stationary manner by signal values of a plurality of symbols transmitted before the transmission of the specific symbol, the process comprising the steps of:

acquiring the signal value of the specific symbol from a signal transmitted via the transmission path;

predicting the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol;

determining the value taken by the specific symbol, on the basis of the signal value of the specific symbol acquired from the signal transmitted via the transmission path and on the basis of the predicted values for respective values allowed to be taken by the specific symbol, receiving with a receiver a test signal including a plurality of symbols taking predetermined values; and acquiring a characteristic of an influence of a signal value of a symbol, included in the symbols of the test signal, transmitted before the transmission of the specific symbol on the signal value of the specific value, on the basis of the signal value of the specific symbol of the test signal received by the receiver.

8. A signal processing apparatus adapted to process a signal transmitted via a transmission path in which a signal value of a specific symbol is influenced in a stationary manner by signal values of a plurality of symbols transmitted before the transmission of the specific symbol, comprising:

an acquisition unit adapted to acquire the signal value of the specific symbol from a signal transmitted via the transmission path;

a prediction unit adapted to predict the signal value of the specific symbol for each of values allowed to be taken by the specific symbol, on the basis of values taken by the plurality of symbols transmitted before the transmission of the specific symbol and on the basis of characteristics of influences of the signal values of the plurality of symbols transmitted before the transmission of the specific symbol on the signal value of the specific symbol;

a determination unit adapted to determine the value taken by the specific symbol, on the basis of the signal value of the specific symbol acquired by the acquisition unit and the predicted values given by the prediction unit for respective values allowed to be taken by the specific symbol, a receiver that receives a test signal including a plurality of symbols taking predetermined values; and an acquisition unit that acquires a characteristic of an influence of a signal value of a symbol, included in the symbols of the test signal, transmitted before the transmission of the specific symbol on the signal value of the specific value, on the basis of the signal value of the specific symbol of the test signal received by the receiver.

* * * * *